United States Patent
Wang et al.

(10) Patent No.: US 11,226,673 B2
(45) Date of Patent: Jan. 18, 2022

(54) AFFECTIVE INTERACTION SYSTEMS, DEVICES, AND METHODS BASED ON AFFECTIVE COMPUTING USER INTERFACE

(71) Applicants: Institute of Software Chinese Academy of Sciences, Beijing (CN); Shanghai Xiaoi Robot Technology Co., Ltd., Shanghai (CN)

(72) Inventors: Hongan Wang, Beijing (CN); Hui Wang, Shanghai (CN); Hui Chen, Beijing (CN); Yuning Wang, Shanghai (CN); Zhihao Li, Beijing (CN); Pinpin Zhu, Shanghai (CN); Naiming Yao, Beijing (CN); Jiaqi Zhu, Beijing (CN)

(73) Assignees: Institute of Software Chinese Academy of Sciences, Beijing (CN); Shanghai Xiaoi Robot Technolgy Co., Ltd., Shanghai (CN)

(*) Notice: Subject to any disclaimer, the term of this patent is extended or adjusted under 35 U.S.C. 154(b) by 750 days.

(21) Appl. No.: 16/080,301

(22) PCT Filed: May 25, 2018

(86) PCT No.: PCT/CN2018/088389
§ 371 (c)(1),
(2) Date: Aug. 27, 2018

(87) PCT Pub. No.: WO2019/144542
PCT Pub. Date: Aug. 1, 2019

(65) Prior Publication Data
US 2021/0191506 A1    Jun. 24, 2021

(30) Foreign Application Priority Data

| Jan. 26, 2018 | (CN) | 201810077175.0 |
| Jan. 26, 2018 | (CN) | 201810078132.4 |
| Jan. 26, 2018 | (CN) | 201810079432.4 |

(51) Int. Cl.
*G06F 3/041*    (2006.01)
*G06F 3/01*     (2006.01)
(Continued)

(52) U.S. Cl.
CPC ............... *G06F 3/011* (2013.01); *G06N 5/02* (2013.01); *G06N 7/005* (2013.01); *G06F 2203/011* (2013.01)

(58) Field of Classification Search
CPC ....................... G06F 3/048; G06F 2203/011
See application file for complete search history.

(56) References Cited

U.S. PATENT DOCUMENTS

| 2013/0185648 A1 | 7/2013 | Kim |
| 2015/0278783 A1* | 10/2015 | Wantz, II ........... G06Q 30/0641 705/39 |
| 2016/0127641 A1* | 5/2016 | Gove ................... G06T 1/0007 348/143 |

FOREIGN PATENT DOCUMENTS

| CN | 105843118 A | 8/2016 |
| CN | 105843381 A | 8/2016 |

(Continued)

OTHER PUBLICATIONS

Office Action dated Mar. 17, 2020, issued in corresponding Chinese Patent Application No. 201810077175.0.
(Continued)

*Primary Examiner* — Insa Sadio
(74) *Attorney, Agent, or Firm* — Morgan, Lewis & Bockius LLP

(57) ABSTRACT

The present disclosure includes an affective interaction apparatus, comprising an affective interaction computing module including a user intention computing processor to receive emotion-related data and an emotion state of a user;

(Continued)

and identify a user intention based on the emotion-related data and the emotion state, the user intention including an affective intention and/or an interaction intention, the affective intention corresponding to the emotion state and including an affective need of the emotion state, the interaction intention including one or more transaction intentions.

18 Claims, 21 Drawing Sheets

(51) Int. Cl.
*G06N 5/02* (2006.01)
*G06N 7/00* (2006.01)

(56) References Cited

FOREIGN PATENT DOCUMENTS

| CN | 106537294 A | 3/2017 |
|----|-------------|--------|
| CN | 106649762 A | 5/2017 |
| CN | 106663095 A | 5/2017 |
| CN | 106683672 A | 5/2017 |
| CN | 106773923 A | 5/2017 |
| CN | 107291654 A | 10/2017 |
| CN | 107562816 A | 1/2018 |

OTHER PUBLICATIONS

International Search Report and Written Opinion dated Oct. 26, 2018, issued in corresponding International Patent Application No. PCT/CN2018/088389.

\* cited by examiner

AFFECTIVE INTERACTION SYSTEMS, DEVICES, AND METHODS BASED ON AFFECTIVE COMPUTING USER INTERFACE

CROSS-REFERENCE TO RELATED APPLICATION

This application claims the priority and benefit of Chinese Patent Application Nos. 201810077175.0 (entitled "Affective Interaction Methods and Devices, Computer Readable Storage Medium, and Computing Devices"), 201810079432.4 (entitled "Interaction Intention Determination Methods and Devices, and Computing Devices and Storage Medium"), and 201810078132.4 (entitled "Human-Computer Interaction Methods and Devices"), all of which were filed on Jan. 26, 2018 and are incorporated herein in their entirety by reference.

TECHNICAL FIELD

The present disclosure relates to an affective interaction computing technology field, and more particularly, to systems, devices, and methods for affective interaction with a user based on an affective computing user interface ("AUI").

BACKGROUND

A human-computer interaction involves the interfaces between people (users) and computers. Traditionally, human-computer interaction focuses on communication of information, such as instructions, conversations, navigations, browsing and exploring. Despite the fact that emotion is a fundamental part of our every-day communication, it has usually been ignored by human-computer interaction technology over the years. This lack of any emotional interaction has, in many ways, made using technology frustrating for users. When humans are communicating information in an interaction session, emotions and affective information are accompanying. In order to build smart machines that provide satisfying interaction with users, it is important for the machine to make accurate information exchange as well as affective interaction.

Thus, it is highly needed to develop a general and standardized affective interaction system, device, and methods that are capable of collecting and recognizing human emotions, identifying and strategizing for interaction and affective intentions contained in the emotions, and generating affective expressions in various modalities as a response within human-machine affective interaction.

SUMMARY

The present disclosure includes an exemplary affective interaction apparatus. The exemplary affective interaction apparatus in accordance with the present disclosure comprises: affective interaction computing module including a user intention computing processor to receive emotion-related data and an emotion state of a user; and identify a user intention based on the emotion-related data and the emotion state, the user intention including an affective intention and/or an interaction intention, the affective intention corresponding to the emotion state and including an affective need of the emotion state, the interaction intention including one or more transaction intentions.

In some embodiments, the exemplary apparatus further comprises a multichannel front-end terminal coupled to affective interaction computing module and including a data collector to: capture emotion-related data from the user. The exemplary apparatus also comprises an emotion recognizer, in the affective interaction computing module, coupled to the data collector and the user intention computing processor to receive the emotion-related data, recognize the emotion state based on the emotion-related data.

In some embodiments, the exemplary apparatus also comprises an affective strategy formulator coupled to the user intention computing processor to formulate an affective command based on the emotion state and the user intention, the affective command including an executable instruction for generating an affective expression in one or more modalities corresponding to the user intention.

The present disclosure also includes an exemplary affective interaction method. The exemplary method in accordance with the present disclosure comprises: receiving, via a user intention computing processor, emotion-related data and an emotion state from a user; and identifying a user intention based on the emotion-related data and the emotion state, the user intention including an affective intention and/or an interaction intention, the affective intention corresponding to the emotion state and including an affective need of the emotion state, and the interaction intention including one or more transaction intentions.

The present disclosure further includes an exemplary affective interaction system based on AUI. The exemplary system in accordance with the present disclosure comprises: an affective interaction computing module including a user intention computing processor to: receive emotion-related data and an emotion state of a user, and identify a user intention based on the emotion-related data and the emotion state, the user intention including an affective intention and/or an interaction intention, the affective intention corresponding to the emotion state and including an affective need of the emotion state, the interaction intention including one or more transaction intentions; and an affective strategy formulator of the affective interaction computing module coupled to the user intention computing processor to: formulate an affective command based on the emotion state and the user intention, the affective command including an executable instruction for generating an affective expression in one or more modalities corresponding to the affective intention.

In some embodiments, the exemplary affective interaction system also comprises a multichannel front-end terminal including a data collector to: capture emotion-related data in one or more modalities from the user. The exemplary system further comprises an affective interaction computing module including an emotion recognizer coupled to the data collector to: receive the emotion-related data, recognize an emotion state based on the emotion-related data, the emotion state containing a discrete emotion category, and/or a dimensional emotion value. In some embodiments, the exemplary system further comprises an affective computing expression generator coupled to the affective strategy formulator to generate the affective expression based on the affective command, and present the generated affective expression to the user.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

An affective interaction system based on an affective computing user interface ("AUI") may enable a user to make affective interaction in one or more modalities with the system and receive affective feedbacks from the system through a process comprising, e.g., emotion-related data collection, emotion recognition, user intention computing, affective strategy formulation, and affective computing expression generation.

An affective interaction system refers to a system that may build a harmonious human-machine interaction environment by enabling the system and machines to recognize, interpret, and simulate human affects. The difference between an affective interaction system and a conventional user interactive system is its ability to simulate empathy. The affective interaction system is capable of interpreting the emotional state of humans and adapting its behavior to them, and giving an appropriate response to those emotions through creating a feedback loop of affective interaction, including emotion-related data collection, emotion recognition, intention identification computing, strategy formulation, and affective computing expression.

An AUI refers to a user interface that a user uses to interact his emotions with the affective interaction system. A user may initiate an affective interaction by expressing his emotions to the AUI by any available means of operation and control. And the AUI may deliver any relevant command, emotion, information, data, user input, request, and other information to the computing module of the affective interaction system, and simultaneously feed a result and an output produced by the affective interaction system back to the user. For example, an AUI may be a chat window of an instant massage APP (application), a webpage, an operation panel, a communication channel of a companion robot, a touch screen of a smart wearable, etc.

The affective interaction system, according to embodiments of the present disclosure, is capable of systematically processing affective interaction in various modalities. It performs a complete process of affective interaction, including but not limited to intention comprehension/computation and strategy formulation. In some embodiments, emotion information is involved in the whole interaction loop, as explained below. In some embodiments, the system may use emotion-related data only for parts of the affective interaction process. For example, the system may analyze emotion-related data of a user to determine user's preference or as an indication of service quality but does not necessarily formulate an affective strategy or generate affective expression as feedback.

Figure 1:
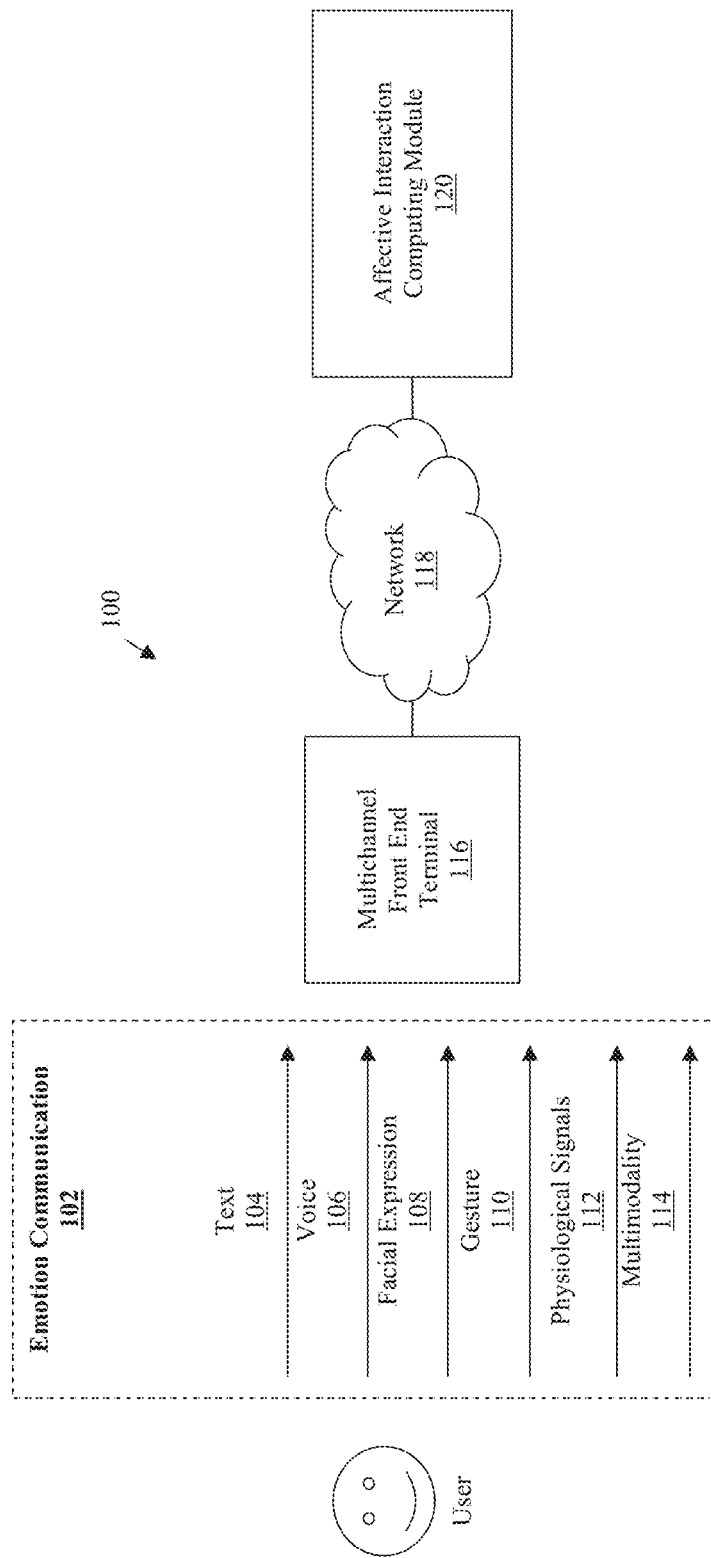
FIG. 1 is a block diagram illustrating an exemplary affective interaction system, according to embodiments of the present disclosure.

FIG. 1 is a block diagram illustrating an exemplary affective interaction system 100. Exemplary system 100 may be any type of system that provides affective interaction to a user based on an AUI, such as a service robot, a companion robot, a smart wearable, smart furniture, a smart home device, etc. System 100 may include, among other things, a multichannel front-end terminal 116, a network 118, and an affective interaction computing module 120. In some embodiments, multichannel front-end terminal 116 is coupled, through network 118, to affective interaction computing module 120. Module 120 may be located in the same hardware device as terminal 116 or a separate hardware device subject to different designs in different embodiments. For example, after terminal 116 collects the emotion communication 102, it may send or assign the received data and processing request to module 120 through network 118.

Module 120 is capable of recognizing an emotion in the data, identifying an intention of a user, and formulating a strategy based on the intention, as further explained below. Terminal 116 may then receive commands from module 120 and generate an affective expression to feed back to the user.

Multichannel front-end terminal 116 may be a hardware device such as a robot, a smart terminal, a smartphone, an instant message ("IM") platform, or any electronic device capable of providing an interface for a human user to make affective interaction with system 100. Through an affective interface of terminal 116, the user may make an emotion communication 102 in one or more modalities, such as a text 104, a voice 106, a facial expression 108, a gesture 110, a physiological signal 112, and/or a multimodality 114, and receive affective feedbacks also in one or more modalities. Text 104 may be any written information or expression in human or computer readable language, such as a word, a text message, an emoji, etc. Voice 106 may be any sound made by a human being using the vocal folds for talking, singing, laughing, crying, screaming, etc. Facial expression 108 may be an observed facial movement that reflects one or more motions or positions of the muscles beneath the skin of a user's face, such as a sad look, laughing, raising eyebrows, an eye contact, etc. Gesture 110 may be any non-verbal visible body movement, such as a hand gesture, shaking head, nodding head, shrugging shoulders, walking around, etc. Physiological signal 112 may be monitored physiological signals generated from a central nervous system and/or an autonomic nervous system of a human, including a heartbeat rate, a blood pressure, an electrocardiogram, an electroencephalogram, an electromyogram, a body temperature, a blood volume pulse rate, a galvanic skin response, etc.

Terminal 116 provides an affective computing user interface that is capable of collecting a user's emotion communication and deriving emotion-related data for the purpose of further processing. In later stages of the affective interaction session, terminal 116 may receive commands from another device, e.g. module 120, and execute such commands and generate affective expressions to feed back to the user. For example, in the embodiment illustrated in FIG. 1, a user may make emotion communication 102, which may be collected by terminal 116. Terminal 116 may then send the received emotion communication 102 to module 120 through network 118 for further processing. Module 120 may accordingly complete the processing and transmit the results back to terminal 116 in order to enable terminal 116 to accordingly provide affective expressions as a feedback to the user.

Network 118 may be a digital telecommunication network that enables nodes to share resources. It may include any combination of wide area networks (WANs), local area networks (LANs), wireless networks, personal area networks (PANs), metropolitan area networks (MANs), enterprise private networks (EPNs), virtual private networks (VPNs), etc., which are suitable for sharing data and information.

Affective interaction computing module 120 may be a computing module that may contain one or more computing devices to process any computation required in an affective interaction session between a user and an AUI system. Module 120 may be allocated in one or more hardware devices. In the exemplary embodiment illustrated in FIG. 1, module 120 is coupled to terminal 116, and may receive data or request therefrom through network 118. For example, after terminal 116 receives emotion communication 102, it may send the received data and process request to module 120 through network 118. Module 120 is capable of recognizing an emotion in the data, identifying an intention of the user, formulating a strategy based on the intention, and transmitting an affective command derived from the strategy back to terminal 116 for an affective expression, as further explained below.

Figure 2:
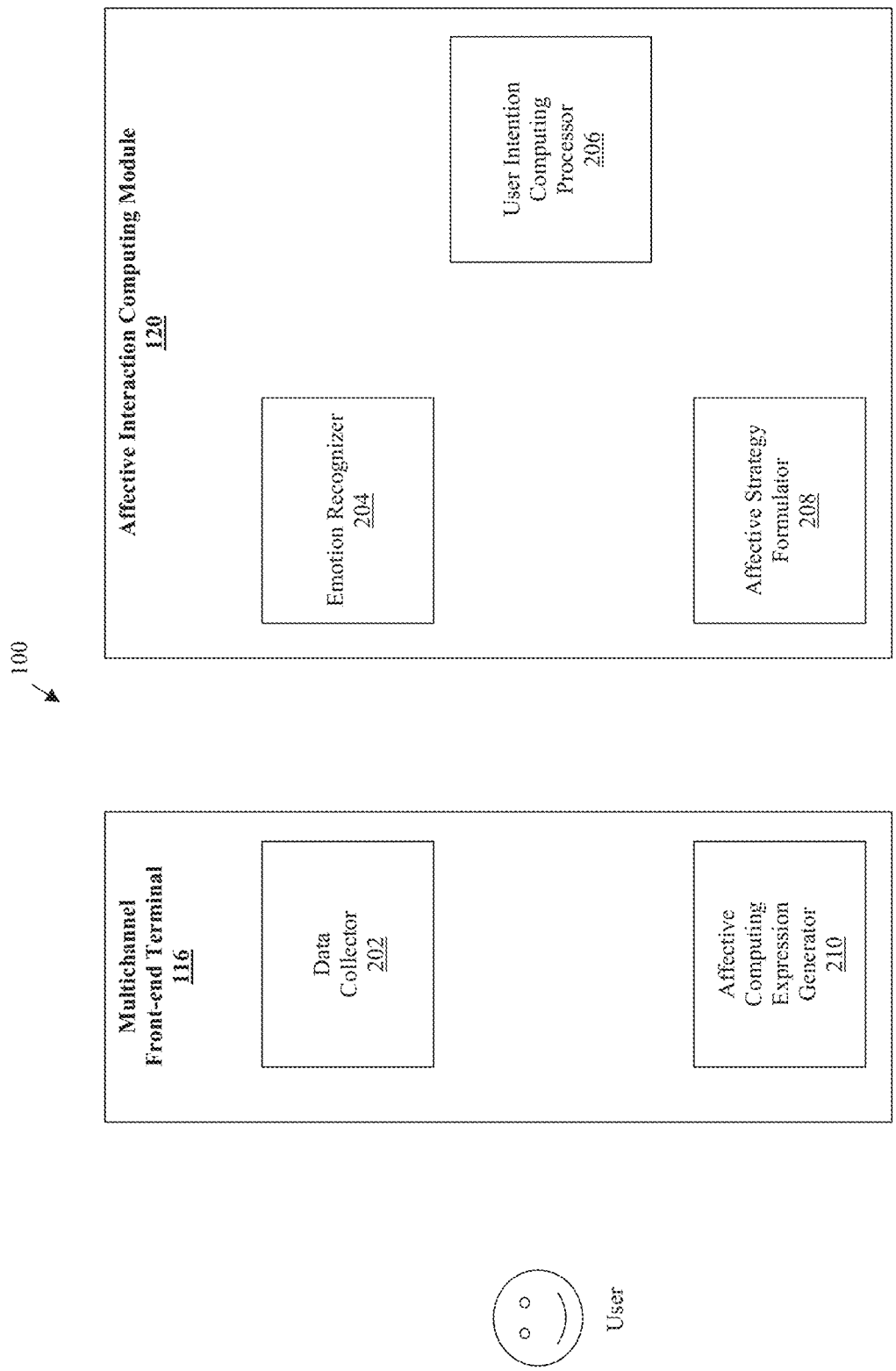
FIG. 2 is a block diagram illustrating an exemplary affective interaction system of FIG. 1 comprising a multi-channel front-end terminal and an affective interaction computing module, according to embodiments of the present disclosure.

FIG. 2 illustrates a block diagram illustrating an exemplary affective interaction system 100 containing a multichannel front-end terminal 116 and an affective interaction computing module 120, consistent with embodiments of the present disclosure. Terminal 116 may include, among other things, a data collector 202 and an affective computing expression generator 210. Module 122 may include, among other things, an emotion recognizer 204, a user intention computing processor 206, and an affective strategy formulator 208. Such components may be arranged in any sequence or order.

Data collector 202 may be implemented as a hardware device running one or more computing programs to capture an emotion communication from a user, analyze the captured emotion communication data, and derive emotion-related data. In some embodiments, collector 202 is capable of capturing emotion representations in multiple modalities. Based on such multimodal emotion representations, collector 202 is able to analyze the captured emotion communication and produce emotion-related data of different forms. Collector 202 serves as a data collecting and analyzing tool in multichannel front-end terminal 116 and facilitates the data input process of an affective interaction system 100.

Emotion recognizer 204 may be implemented as a hardware device running one or more computing programs to receive an emotion-related data, recognize an emotion feature based on different forms of emotion-related data. Further, it may fuse the recognized emotion features into a multimodal emotion feature. It may then classify and/or regress a multimodal emotion. Finally, it may obtain an emotion state. An emotion state may refer to a description of state of an emotion expressed by a user and perceived and recognized by an affective interaction system. Emotion state 304 may be expressed in many forms. In some embodiments, the emotion state may be represented as emotion categories. For instance, emotion state may be represented in six basic categories, such as joy, sadness, anger, surprise, fear and disgust. Such categories are independent from each other and describe different kinds and aspects of human emotions. Moreover, emotion may be categorized as one of 22 emotion categories differentiated by the psychologically significant situations they represent. And the 22 categories are derived from a process of assessing their level of focus on events, on actions, and on objects. In some other embodiments, the emotion state may be represented in dimensional emotion model. Under dimensional model of emotion theory, an emotion is defined according to multiple dimensions, for example, "pleasure versus unpleasure," "arousal or non-arousal," and "dominance or submissiveness" may be used as three dimensions of emotions and pleasure versus unpleasure," and "arousal or non-arousal," may be used as a two dimensions of emotions. And an emotion state may be described according to its coordinate value in each dimension, which indicates its location in the dimension.

User intention computing processor 206 may be implemented as a hardware device running one or more computing programs to identify a user intention including an interaction intention and/or an affective intention based on one or more input parameters. In some embodiments, the interaction intention may include one or more transaction intentions. Transaction refers to any matter, action or task that is to be completed or conducted in a human-computer interaction. The input parameters may include, for example, emotion-related data, an emotion state, scenario content, an interactive context, personalization information, semantic data, general knowledge data, domain knowledge data, etc.

Affective strategy formulator 208 may be implemented as a hardware device running one or more computing programs to formulate strategies for the interaction intention and affective intention and generate an affective command based on multiple input parameters. The input parameters may include, for example, a user intention, scenario content, an interactive context, domain knowledge data, and general knowledge data, etc., as further explained below.

Affective computing expression generator 210 may be implemented as a hardware device, such as a monitor, a speaker, a mobile phone screen and speaker, and a robot, running one or more computer programs to generate an affective expression and convey the affective expression to a user based on an affective command. Generator 210 may generate affective expressions in one or more modalities, such as a text, a voice, a symbol, a facial expression, a gesture, and/or a multimodality, that is generated based on the instructions specified in the affective command. For example, generator 210 may generate a text in natural language with sentiment information on a screen. In some embodiment, generator 210 may ensure the consistency between the generated text and requirements in the affective command based on an emotion expression word database and/or a semantic database. In some other embodiments, generator 210 may ensure the consistency between the generated text and requirements in the affective command through in-depth machine learning which enables the machine to understand which specific text may be generated when executing a certain affective command. In addition, generator 210 may generate a synthesized vocal speech with emotional information which reflects the way the words are spoken through, e.g. a speaker. Generator 210 may first determine a text content of the speech based on the affective command and guarantee the consistency with the affective command through a similar process as generating text. Then generator 210 may synthesize vocal speech based on appropriate vocal feature parameters as required in the affective command, including phoneme, rhythm, smoothness of the voice, etc. Furthermore, generator 210 may generate a facial expression in a synthesized image or video displayed on a screen or monitor, including a humanlike or cartoon facial expression. The generated facial expression may comprise certain emotion of certain intensity by simulating facial muscle movement of human, in compliance with the requirements in the affective command. For example, when the affective command requires "happy" emotion as feedback to the user, generator 210 may generate a synthesized smiley face in a picture or a video. In some embodiments, generator 210 may generate a multimodal affective expression that may be a combination of a text, a voice, a symbol, a facial expression, and any other relevant modality. Expressing generated affective expression in multiple modalities may require generator 210 to maintain a high level of synergic operation among all modalities. Generator 210 may ensure generated affect 210 to be consistent with the affective command regarding the accuracy of the content and intensity of the affective expression in each modality and the accurate execution of the instructions.

In some embodiments, system 100 may include a data collector 202, an emotion recognizer 204, a user intention computing processor 206, an affective strategy formulator 208, and a computing expression generator 210. In such embodiments, there may be a complete affective interaction loop between a user and a affective interaction system, including data collection, emotion recognition, intention identification, strategy formulation, and affective expression generation. For instance, a home robot with such system may provide a microphone and a touch screen as input device and a speaker and a monitor as output device. A user may talk to the home robot and say that "I have a headache after a long day full of meetings. Please play music for me." A data collector on the home robot may use the microphone to capture the user's voice and compile the voice into an audio file for processing. The data collector may transmit the audio file to an emotion recognizer in the home robot. The emotion recognizer may recognize an emotion feature in the audio file by converting the audio into a text file and analyzing the linguistic feature of the text file and the acoustic feature of the audio file. The emotion recognizer may then derive an emotion state of the user as "tired" based on the recognized emotion features. Based on the emotion state, a semantic meaning of the user's speech, and domain knowledge data, a user intention computing processor in the home robot may identify an interaction intention of the user as "play music," and an affective intention as "expect to be comforted." After combining the affective intention and the interaction intention, the processor may then derive a user intention as "expect to be comforted by playing music" and transmit the user intention to an affective strategy formulator in the home robot. The formulator may formulate an affective strategy and an interaction strategy as "play a comforting song" with an intensity level of "mid-level" based on the user intention and the emotion state. Based on the affective strategy and the interaction strategy, as well the scenario content and the availability of output device, the formulator may produce an affective command as "play a comforting song with a mid-level intensity and broadcast the name of the song to the user in a comforting tone" and transmit the affective command to an affective computing expression generator in the home robot. The generator may then execute the affective command and generate an affective expression by selecting a song based on the criteria in the affective command. It may also adjust the content, tone, and speed of an announcement voice to make it sound comforting. The generator may then convey the affective expression to the user by firstly announcing "Now, let me play a song for you to make you relaxed" in a soothing tone and a slow speed via the speaker and then playing a comforting song. Compared to a normal home robot (without such affective interaction system) that may just play a regular song and announce to the user in a normal tone, the home robot in this example can also understand and fulfill the user's affective intention based on the affective interaction system.

In some other embodiments, system 100 may include a user intention computing processor 206. In such embodiments, the affective interaction system may be able to identify an affective intention and an interaction intention of a user without data collection and emotion recognition. For example, a service robot in a shopping mall may include such affective interaction system. When the service robot senses, via a sensor, a user approaching it, even before the user inputs any information or makes any emotion representation, a user intention computing processor in the service robot may have already identified an interaction intention of the user as "expect to receive customer service" and an affective intention of the user as "expect to be welcomed" based on pre-set rules.

In some other embodiments, system 100 may comprise a user intention computing processor 206 and an affective strategy formulator 208. In such embodiments, the affective interaction system may be able to identify an affective intention and an interaction intention of a user and formulate an affective command without data collection and emotion recognition. For example, a service robot in a shopping mall may implement such affective interaction system. When the service robot senses, via a sensor, a user approaching it, even before the user inputs any information or makes any emotion representation, a user intention computing processor contained in the service robot may have already identified an interaction intention of the user as "expect to receive customer service" and an affective intention of the user as "expect to be welcomed" based on pre-set rules. Based on the interaction intention and the affective intention, an affective strategy formulator contained in the service robot may formulate an affective command, such as "announce a welcome greeting to the user," "display a smiley face to the user," etc.

In some other embodiments, system 100 may comprise a user intention computing processor 206, an affective strategy formulator 208, and an affective computing expression generator 210. In such embodiments, the affective interaction system may be able to identify an affective intention and an interaction intention of a user, formulate an affective command, and generate affective expression without data collection and emotion recognition. For example, a service robot in a shopping mall may implement such affective interaction system. When the service robot senses, via a sensor, a user approaching it, even before the user inputs any information or makes any emotion representation, a user intention computing processor in the service robot may have already identified an interaction intention of the user as "expect to receive customer service" and an affective intention of the user as "expect to be welcomed" based on pre-set rules. Based on the interaction intention and the affective intention, an affective strategy formulator in the service robot may formulate an affective command, such as "announce a welcome greeting to the user," "display a smiley face to the user," etc. An affective computing expression generator in the service robot may receive and execute the affective command and generate an affective expression, such as announcing a welcome greeting via a speaker, displaying a smiley face on a screen, etc.

In some other embodiments, system 100 may comprise a user intention computing processor 206 and an affective computing expression generator 210. In such embodiments, the affective interaction system may be able to identify an affective intention and an interaction of a user without data collection and emotion recognition, and generate an affective expression without strategy formulation. For example, a service robot in a shopping mall may implement such affective interaction system. When the service robot senses a user approaching it, even before the user inputs any information or makes any emotion representation, a user intention computing processor in the service robot may have already identified an interaction intention of the user as "expect to receive customer service" and an affective intention of the user as "expect to be welcomed" based on pre-set rules. Then an affective computing expression generator in the service robot may directly generate a welcoming affective expression, such as "announce a welcome greeting to the user", based on the affective intention and the interaction intention.

In some other embodiments, system 100 may comprise a data collector 202, an emotion recognizer 204, and a user intention computing processor 206. In such embodiments, the affective interaction system may put emphasis on the intention identification process, rather than strategy formulation and affective expression generation. Affective intention in such embodiments may not be used for formulating affective strategy or generating affective expression, but it may be used for improving the interaction intention identification process, providing extra service, and/or just learning about user's affective intention. For example, a student surveillance system in a school may contain such affective interaction system. By collecting a student's facial expression via a camera by a data collector and recognizing an emotion state of the user by an emotion recognizer such as "joy," "anxious," "nervous," etc., a user intention computing processor contained in the surveillance system may identify an affective intention of the student, such as "expect to be encouraged," "expect to be comforted," "expect to communicate," etc. Such affective intention may not be used for formulating an affective command or generating an affective expression by the affective interaction system, but it may facilitate the interaction intention identification process and/or help the school to learn the student's current affective intention.

Figure 3A:
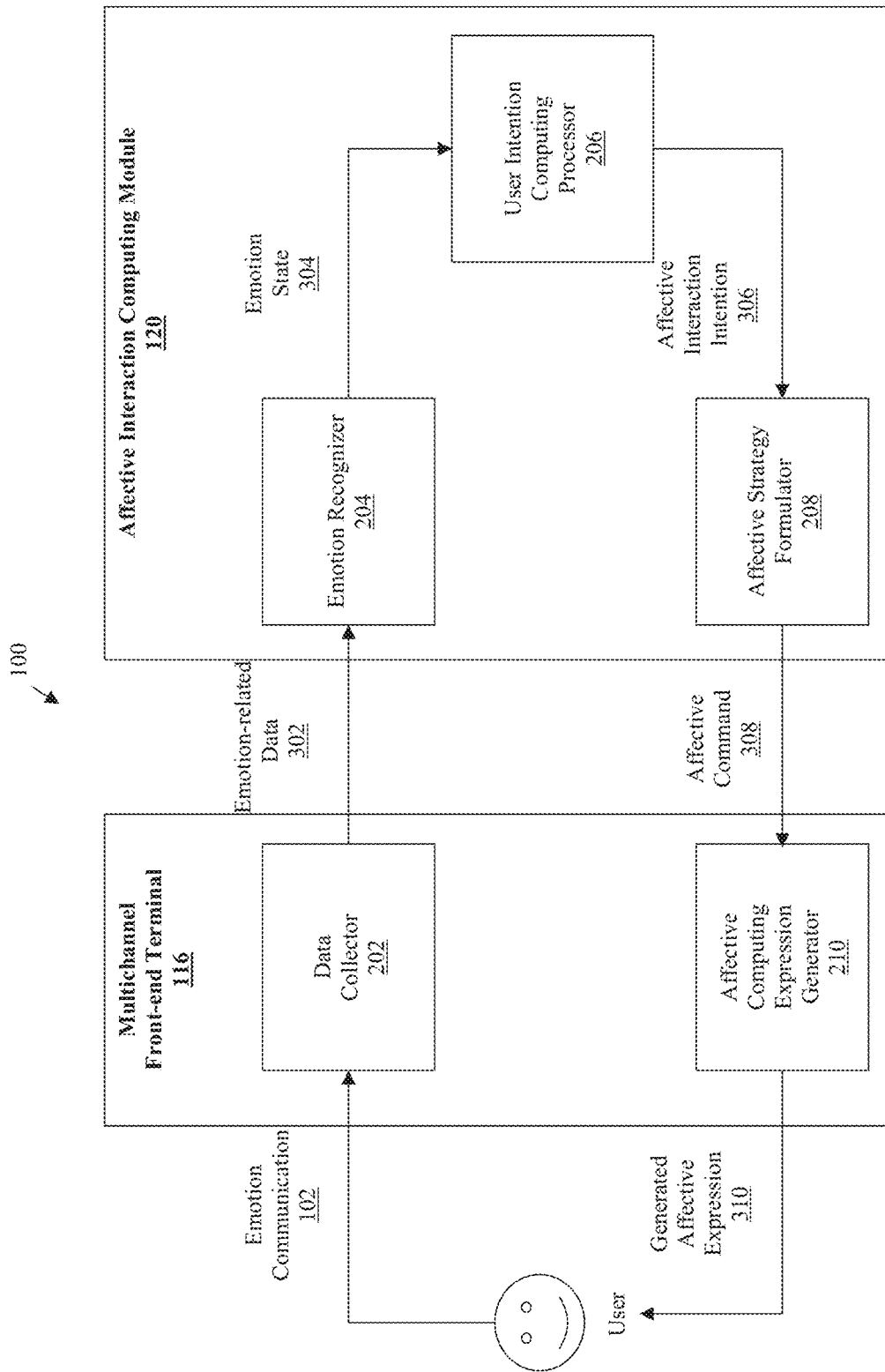
FIG. 3A is a functional diagram illustrating an exemplary affective interaction system, according to embodiments of the present disclosure.

FIG. 3A illustrates a functional diagram of an exemplary affective interaction system 100, consistent with embodiments of the present disclosure. Without departing from the exemplary embodiments, the exemplary process flow may be altered to delete steps, change the order of steps, or include additional steps.

Figure 3B:
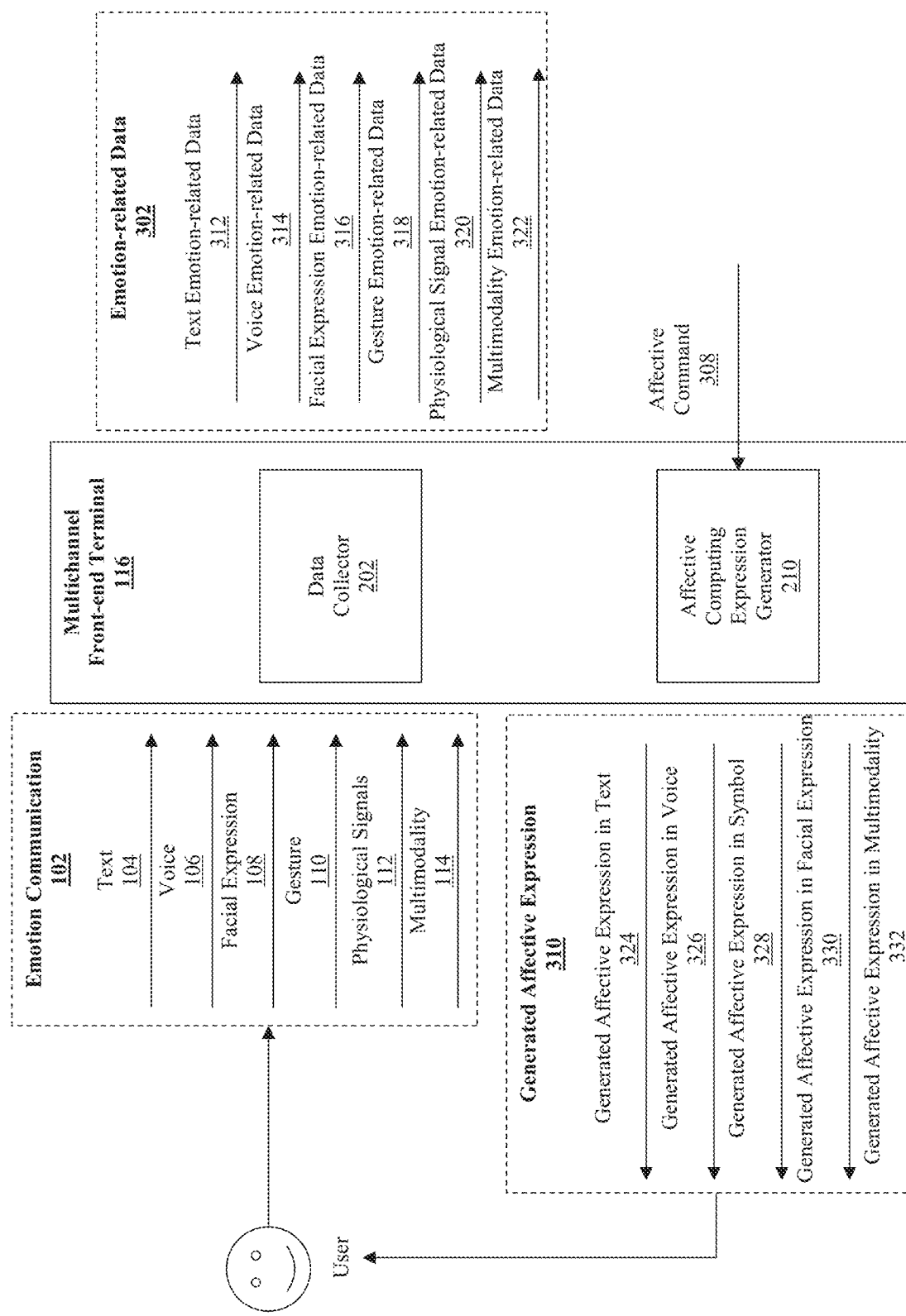
FIG. 3B illustrates a functional diagram illustrating an exemplary multichannel font-end terminal, according to embodiments of the present disclosure.

In an exemplary embodiment illustrated in FIG. 3A, an affective interaction system is capable of conducting an affective interaction session with a user based on an affective computing user interface provided by a multichannel front-end terminal 116 and utilizing affective interaction computing module 122 to process the affective interaction. For example, a user may make motion representation 102 to an affective computing user interface located at terminal 116. Terminal 116 may direct a data collector 202 to capture and process an emotion communication 102 to derive emotion-related data 302. As illustrated in FIG. 3B, terminal 116 may include a data collector 202 and an affective computing expression generator 210 to provide an affective computing user interface to facilitate an affective interaction session. Collector 202 is configured to capture emotion communication 102 in one or more modalities, such as a text 104, a voice 106, a facial expression 108, a gesture 110, a physiological signal 112, and/or multimodality 114. Collector 202 is used at the beginning stage of an affective interaction session, where it serves as an interface to a user and a communication channel for an affective interaction system to collect data and emotion from a user. The output of collector 202 includes emotion-related data 302 that may be in one or more modalities, such as text emotion-related data 312, voice emotion-related data 314, facial expression emotion-related data 316, gesture emotion-related data 318, physiological emotion-related data 320, and/or multimodality emotion-related data 322. Collector 202 may then transmit emotion-related data 302 to, for example, an affective interaction computing module 120 for processing. Text emotion-related data 312 may be used by both emotion recognizer 204 and user intention computing processor 206. Text emotion-related data 312 may be used as history data for the future affective interaction session to derive interactive context, or may be used to derive scenario content based on the current scenario information. In addition, voice emotion-related data 314 may be may be used by emotion recognizer 204 to authenticate user's identity and accumulate user's personal information and habit data in order to help the system to more accurately recognize user's voice and understand user's emotion in the voice. Text converted from voice emotion-related data 314 may be stored as history data and used by user intention computing processor 206 to derive interactive context in future interaction. Also, text converted from voice emotion-related data 314 may be used to derive scenario content. Furthermore, visual data, such as image, video, etc., containing facial expression emotion-related data 316 and gesture emotion-related data 318 may be used by emotion recognizer 204 to record and authenticate user's identity, for example, face ID unlock. In some embodiments, such visual data may be used to derive scenario content. Moreover, physiological signal emotion-related data 320 may be used by emotion recognizer 204 and user intention computing processor 206 to accumulate user's personal information in order to help the system to more accurately understand the user's emotion. Physiological signal emotion-related data 320 may be stored as history data and used to derive interactive context in interaction.

Figure 6:
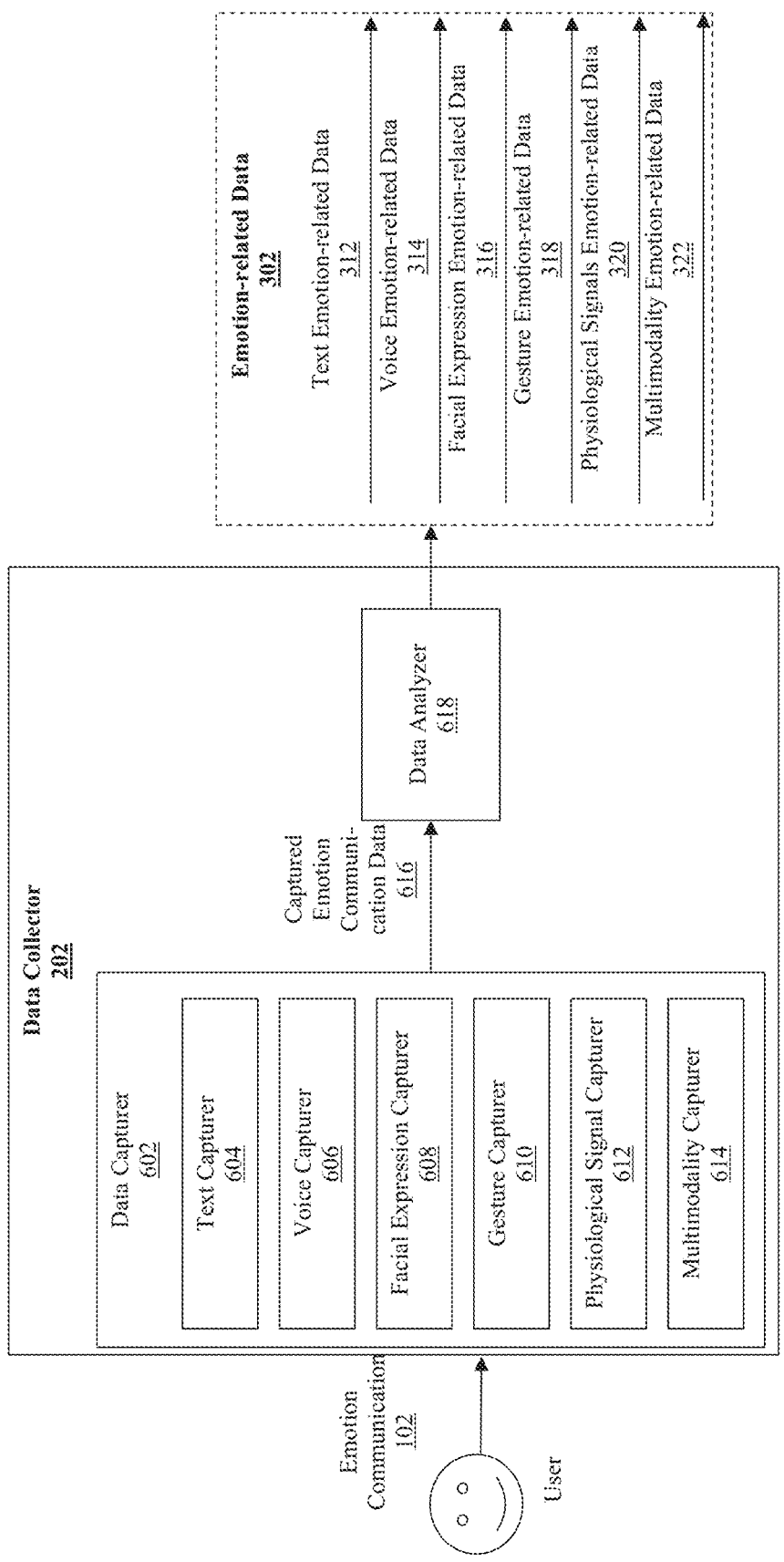
FIG. 6 illustrates a block diagram illustrating an exemplary data collector, according to embodiments of the present disclosure.

As illustrated in FIG. 6, in some embodiments, data collector 202 may include, among other things, a data capturer 602 and a data analyzer 618. Data capturer 602 may capture an emotion communication 102 in one or more modalities, such as a text 104, a voice 106, a facial expression 108, a gesture 110, a physiological signal 112, and/or a multimodality 114. Data capturer 602 may be implemented with different capabilities based on different modalities of emotion communication 102. For example, data capturer 602 may be implemented as a text capturer 604, such as a keyboard, a touch screen, etc., to capture text 104. It may also be implemented as a voice capturer 606, such as a microphone, to capture voice 106. It may further be implemented as a facial expression capturer 608, such as a camera, a sensor, and/or an infrared LED, to capture facial expression 108. In addition, it may be implemented as a gesture capturer 610, such as a camera, a sensor, and/or an infrared LED, to capture gesture 110. Moreover, it may be implemented as a physiological signal emotion capturer 612 to capture physiological signal 112, such as a cardiotachometer to capture heartbeat rate data, a sphygmomanometer to capture blood pressure data, an electrocardiograph to capture electrocardiographic data, an electroencephalograph to capture electroencephalographic data, an electromyograph to capture electromyographic data, a thermometer to capture body temperature data, a blood volume pulse detector to capture blood volume pulse rate data, and/or a galvanic skin response detector to capture galvanic skin response data. Furthermore, it may be implemented as a multimodality capturer 614 to capture multimodality 114 of emotion representations. For example, the system may enable more than one data capturers to capture an emotion communication in more than one modality simultaneously.

With reference to FIG. 6, in some embodiments, data collector 202 may further include a data analyzer 618 to analyze captured emotion communication data 616 to obtain emotion-related data 302. Data analyze 618 may compile captured emotion communication data 616 into emotion-related data 302 of a desired structure, format, annotation, method of storage, and inquiry mode based on the modality of the emotion, different scenarios, and need of further processing. Emotion-related data 302, for example, may be text emotion-related data 312, voice emotion-related data 314, facial expression emotion-related data 316, gesture emotion-related data 318, physiological emotion-related data 320, and multimodality emotion-related data 322. Emotion-related data 302 may be static data or dynamic data. Static emotion-related data may be a certain type of data that records affective interaction between a user and an affective interaction system of a certain moment, such as a photo, a text, an electrocardiogram, or an emoji. Dynamic emotion-related data may be a certain type of streaming data that records the affective interaction between a user and an affective interaction system of a time span, such as a clip of video, a sonogram video, and a clip of audio. Dynamic data may reflect a dynamic change of the affective interaction of a certain time span. Whether to obtain/use static or dynamic data depends on the modality of emotion communication 102 and/or the need of further processing. The format of emotion-related data 302 may be structured such as a data record, or non-structured such as video, audio, signal, text, and so on.

Figure 7:
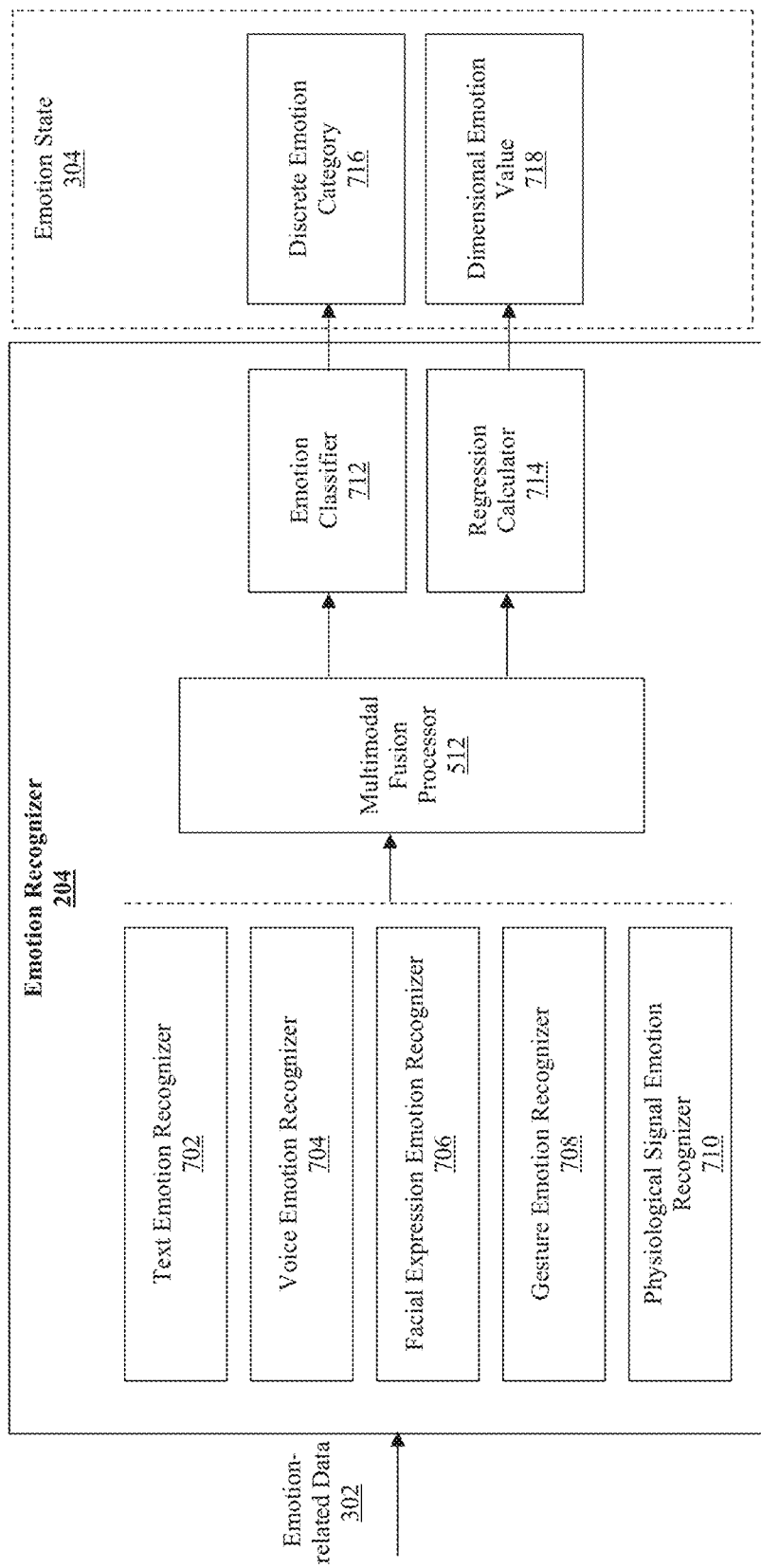
FIG. 7 illustrates a block diagram illustrating an exemplary emotion recognizer, according to embodiments of the present disclosure.

Referring back to FIG. 3A, data collector 202 may then transmit emotion-related data 302 to an emotion recognizer 204 located at affective interaction computing module 120. As illustrated in FIG. 7, emotion recognizer 204 may include different forms of recognizers, a multimodal fusion processor 512, an emotion classifier 712, and a regression calculator 714.

With reference to FIG. 7, emotion recognizer 204 may be configured with different capabilities based on the different forms of emotion-related data 302, such as a text emotion recognizer 702 to recognize text emotion-related data 312, a voice emotion recognizer 704 to recognizer voice emotion-related data 314, a facial expression emotion recognizer 706 to recognize facial expression data 316, a gesture emotion recognizer 708 to recognize gesture emotion-related data 318, and a physiological emotion recognizer 710 to recognize physiological emotion-related data 320.

In some embodiment, text emotion recognizer 702 may be implemented based on machine learning. Based on a database that contains certain type of text emotion-related data and its matched emotion state, text emotion recognizer 702 may be able to learn the recognition and output pattern. It may therefore be able to derive a desired emotion state based on a certain text emotion-related data input. In some other embodiments, text emotion recognizer 702 may be implemented based on natural language processing methods. Such text emotion recognizer may reply on an emotion semantic database and an emotion expression word database to extract key words, determine a property of certain words, and analyze a sentence structure in order to recognize an emotion in the text. They emotion semantic database may contain sematic information of certain polysemous words and the usage of each meaning thereof, in order to enable the text emotion recognizer to eliminate ambiguity and determine an exact emotion expression that is contained in such words. The emotion expression word database may include matching rules for various emotion expression words, which enables the text emotion recognizer to recognize an emotion expressed by difference words when matched together. An exemplary embodiment of the emotion expression word database can be structured as below.

| Word | Property | Number of meanings | Serial No. | Type of Emotion | Strength | Extremity | Type of Emotion (Auxiliary) |
|---|---|---|---|---|---|---|---|
| disorderly | adj | 1 | 1 | Criticizing | 7 | 2 | |
| revenged | adj | 1 | 1 | Criticizing | 5 | 2 | |
| presenility | adj | 1 | 1 | Annoyed | 5 | 2 | |
| blame | verb | 1 | 1 | Criticizing | 5 | 2 | |
| knavish look | noun | 1 | 1 | Criticizing | 5 | 2 | |
| war disaster | noun | 1 | 1 | Loathing | 5 | 2 | Terrified |
| unlucky | adj | 1 | 1 | Criticizing | 5 | 2 | |
| humiliation | noun | 1 | 1 | Annoyed | 5 | 2 | Criticizing |
| Perfidiousness | noun | 1 | 1 | Criticizing | 5 | 2 | |
| upright | adj | 1 | 1 | Praising | 5 | 0 | |

With reference to FIG. 7, voice emotion recognizer 704 may separately or jointly analyze the acoustic features and/or linguistic features in voice emotion-related data 314 in order to recognize the emotion thereof. Acoustic features include features such as energy, frame numbers, a fundamental tone frequency, formant, a noise rate of a harmonic wave, etc. Such features may be described in a form of an example value, a mean value, a greatest value, a median value, a standard deviation, etc. Linguistic features in voice emotion-related data may be the characteristics of the words and language used therein. In some embodiments, voice emotion recognizer 704 may be implemented based on analysis of linguistic features. It may convert the voice emotion-related data into text and process it in a similar way as for text emotion-related data 312 with possible exceptions of different ways of an expression in oral language and written language. In some other embodiments, voice emotion recognizer 704 may be implemented based on analysis of acoustic features by using machine learning. During the learning process, the voice emotion recognizer may extract acoustic features of certain voice emotion-related data from a training database and comprehend the matching rules for such acoustic features and their matched emotion thereof. Therefore, in the future, the voice emotion recognizer may be able to match a certain type of an acoustic feature with a certain emotion based on the matching rules it has learned during the learning process. Furthermore, in some embodiments, voice emotion recognizer 704 may be implemented based on analysis of both acoustic features and linguistic features of voice emotion-related data 314. When there is more than one output, the voice emotion recognizer in such embodiments may make selections and determine a final output based on analysis of a credence and tendentiousness level thereof.

Figure 14:
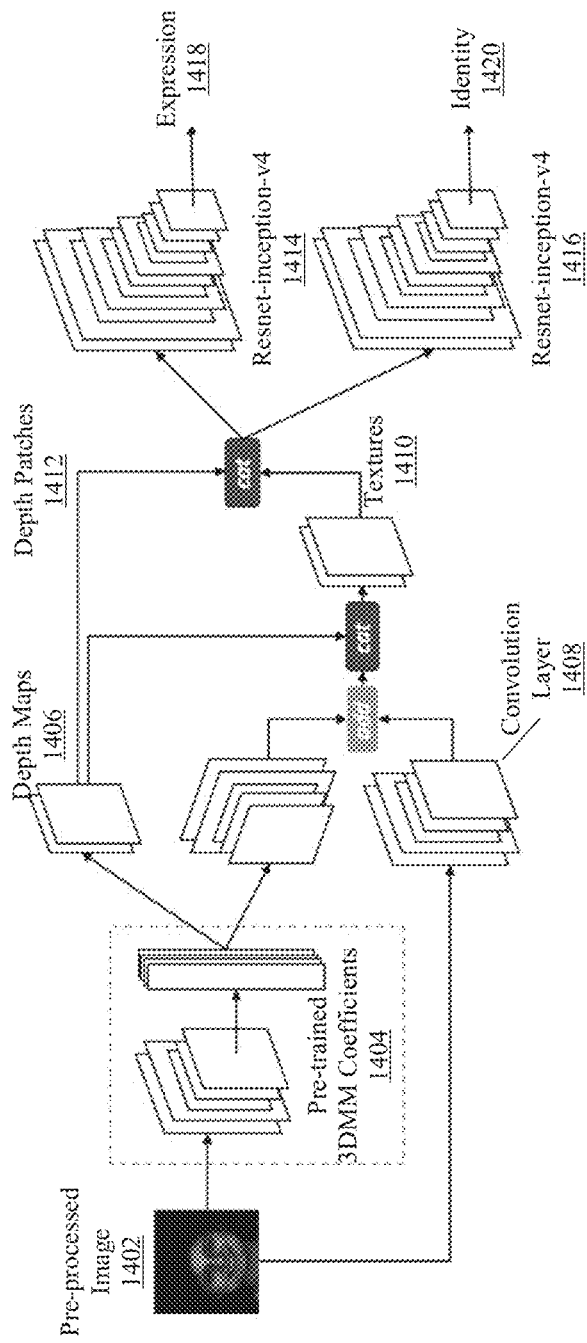
FIG. 14 illustrates an exemplary facial expression recognition process based on 3D morphable model, according to embodiments of the present disclosure.

Facial expression emotion-related data 316 and gesture emotion-related data 318 may be captured with similar tools and compiled in similar data format, as illustrated in FIG. 6. Therefore, with reference to FIG. 7, facial expression emotion recognizer 706 and gesture emotion recognizer 708 may also be implemented similarly based on image and video processing because of the similarities of facial expression emotion-related data 316 and gesture emotion-related data 318. Taking facial expression emotion recognizer 706 as an example, in some embodiments, it can be implemented based on recognizing facial features. In such embodiments, after obtaining facial expression emotion-related data such as an images or a video, the facial expression emotion recognizer may extract static facial feature from an image and extract a series of static facial features and/or facial motion feature from a video. Based on the extracted features, the facial expression emotion recognizer 706 may recognize an emotion feature in such facial expression emotion-related data by using a matching model, a probabilistic model, and/or a support vector machine. Moreover, in some other embodiments, facial expression emotion recognizer 706 may be implemented based on machine learning of human facial expressions by using a 3D morphable model (3DMM), as illustrated in FIG. 14. The 3DMM is a statistical model of 3D facial shape and texture. It can represent a novel face in an image by model coefficients and reconstruct a 3D face (including a facial shape and image textures) from single images based on rendering or scene parameters.

In some embodiments, as illustrated in FIG. 14, a pretrained 3DMM 1404, which can be parameterized with coefficients, may receive a pre-processed image 1402, reconstruct the image to derive a 3D model of the face contained in image 1402, and retain a corresponding relationship between the 3D model and the face contained in image 1402. Such 3D model may include, for example, depth information (e.g., depth maps 1406), texture information, and landmark information. A convolution layer 1408 may then receive and process image 1402 to obtain image features. Such image features may be concatenated ("cat") with the texture information contained in the 3D model to obtain new textures 1410. Textures 1410 may be concatenated ("cat") with geometric information (e.g., depth patches 1412) of neighborhood around landmark points to obtain new features. Depth patches 1412 may be derived from the depth information and/or landmark information in the 3D model. The concatenated data (i.e., the new features) may then be sent to a resnet-inception-v4 1414 and a resnet-inception-v4 1416. Resnet-inception-v4 1414 may be able to extract expression 1418 information from the concatenated data and resnet-inception-v4 1416 may be able to extract identity 1420 information from the concatenated data. The characteristics of such 3D morphable model include: (1) it uses parameterized 3DMM to build a corresponding relation between the 3D model and the face contained in the original image; (2) it uses image, textures, and depth information to represent the overall features of a face; (3) it uses regional geometric information (e.g., depth patches 1412) of neighborhood around landmark points: and (4) it establishes a multi-tasking confrontation relationship between identity identification and facial expression recognition to refine the expression features.

With reference to FIG. 7, physiological signal emotion recognizer 710 may extract statistical data from physiological signal emotion-related data 320 based on a power spectrum of Fourier transform, a feature selection, genetic algorithms, a wavelet transform, an independent component analysis, a common spatial pattern, a sequential floating forward selection, an analysis of a variance, etc. Such statistical data may reflect the features of physiological signal emotion-related data 320 and be used in further processing.

When emotion recognizer 204 receives more than one type of emotion-related data at the same time, it may utilize different forms of emotion recognizers as illustrated above to recognize such emotion-related data separately but simultaneously. Then, emotion recognizer 204 may further include a multimodal fusion processor 512 to fuse the recognized emotion features into multimodal emotion feature. In some embodiments, multimodal fusion processor 512 may just fuse the emotion feature data, if such data is of the same structure and format. However, in some other embodiments, multimodal fusion processor 512 may align emotion features obtained from emotion-related data of different modalities and construct vector quantity of aligned features. For example, when emotion features are extracted from a video and an audio, the multimodal fusion processor may synchronize the features based on the timeline. Then it may derive vector quantity for both emotion features in order for them to be processed as a whole in later stages. For instance, multimodal fusion processor 512 may be implemented to fuse emotion features extracted from audio and video based on a convolutional neural network, as illustrated in FIG. 15.

Figure 15:
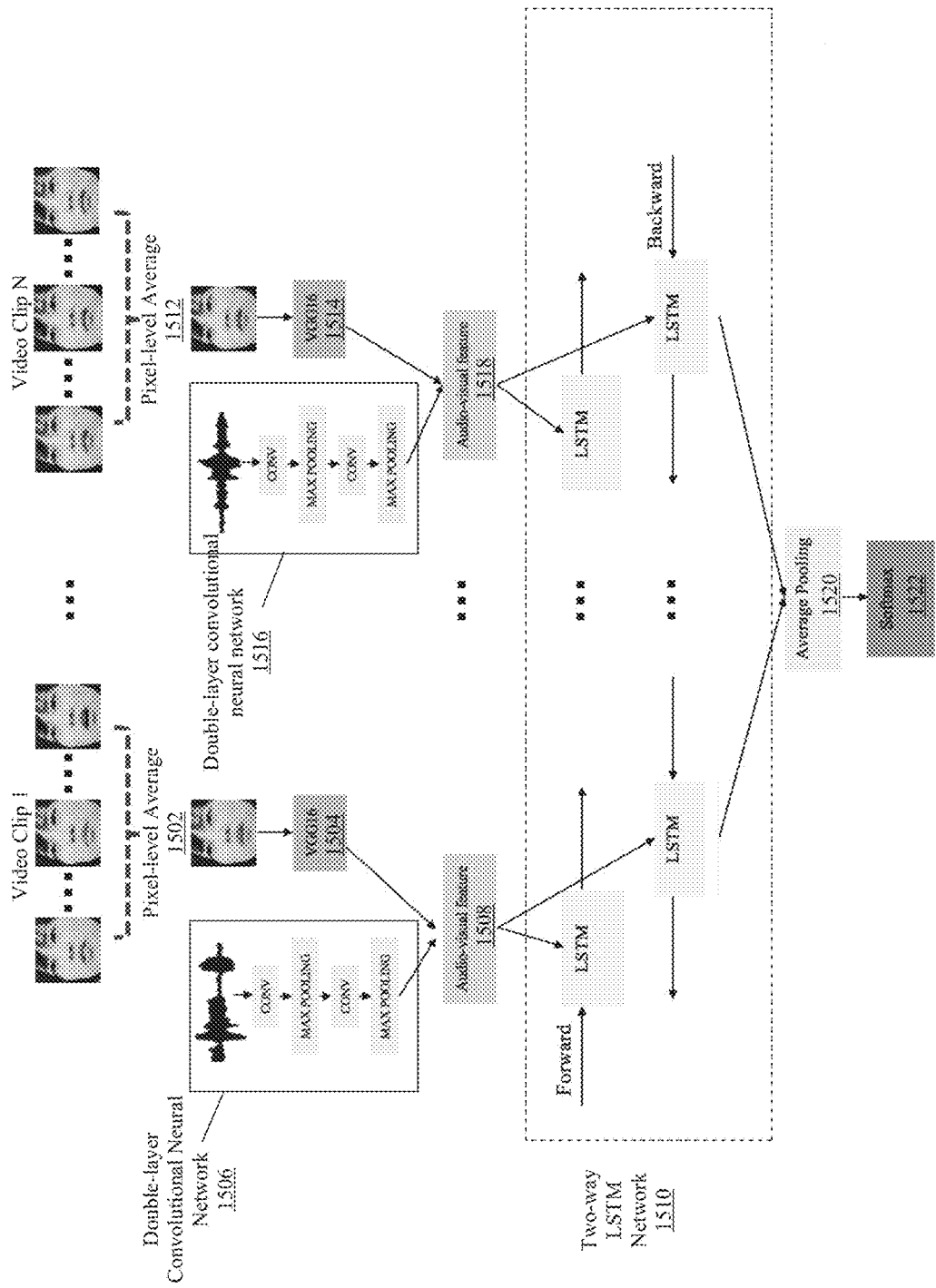
FIG. 15 illustrates an exemplary emotion recognition process of audio-visual data based on convolutional neural network, according to embodiments of the present disclosure.

In some embodiments, as illustrated in FIG. 15, a video may be divided into multiple short clips, such as video clip 1 through video clip N. Each frame of the video clip may be extracted as a single image. A pixel-level average (e.g., pixel-level average 1502 though pixel-level average 1512) may be obtained from the extracted single image in each video clip. And an array of such extracted images in each video clip may be merged as one single image based on the pixel-level average of the extracted images. Each merged image may then be transmitted to a convolutional neural network (e.g., VGG16 1504 through VGG16 1514) for processing. VGG16 (also called OxfordNet) is a 16-layer convolutional neural network architecture named after the Visual Geometry Group from Oxford. It may be trained on millions images and can be used for large-scale image recognition. For example, it can classify images into hundreds or even thousands of object categories.

In FIG. 15, a fifth pooling layer of VGG16 1504 may output a visual feature of each merged image. Meanwhile, an audio of each video clip may be sent to a double-layer convolutional neural network (e.g., networks 1506 through 1516), where the audio may be processed through convolution, max pooling, convolution for the second time, and max pooling for the second time. Network 1506 may then derive an audio feature of the audio. The audio feature and the visual feature may then be linked as one audio-visual feature vector (e.g., audio-visual feature 1508 through audio-visual feature 1518) for each video clip. The audio-visual feature may then be transmitted to a two-way long short-term memory (LSTM) network 1510 for forward and backward processing. After receiving audio-visual feature of each video clip, an average pooling 1520 may then average the audio-visual features as one vector. In addition, such vector may then be transmitted to a softmax function (e.g., softmax 1522) for classification. The softmax function provides probabilities for each class label and is often used in a final layer of a neural network-based classifier. The audio feature and the visual feature are therefore fused into one multimodal feature.

Referring back to FIG. 7, in some other embodiments, multimodal fusion processor 512 may be implemented based on models of emotion feature of each modality that are inter-connected with each other. For example, a video and an audio may be processed based on a hidden Markov model in order to build connections and complementarity between emotion features of two modalities based on the needs of processing. In addition, in some other embodiments, multimodal fusion processor 512 may also be implemented based on separate models of emotion feature of each modality. In such embodiments, each model independently recognizes an emotion feature and outputs all recognized emotion features at the end. For example, recognized emotion features in voice emotion-related data, facial expression emotion-related data, and physiological signal emotion-related data may be output together based on weighted superposition (linear), or the multi-layer perceptron in the convolutional neural network (non-linear), etc.

In addition, with reference to FIG. 7, emotion recognizer 204 may further include an emotion classifier 712 to classify the multimodal emotion feature to acquire discrete emotion category 716. Discrete emotion category 716 may represent emotion in different categories. And such categories may be core and basic emotions of human, so the expression and recognition is fundamentally the same for all individuals regardless of ethnic or cultural differences. Also, emotion recognizer 204 may include a regression calculator 714 to acquire dimensional emotion value 718, for example. Emotion recognizer 204 may then produce emotion state 304 containing discrete emotion category 716 and/or dimensional emotion value 718.

Figure 8:
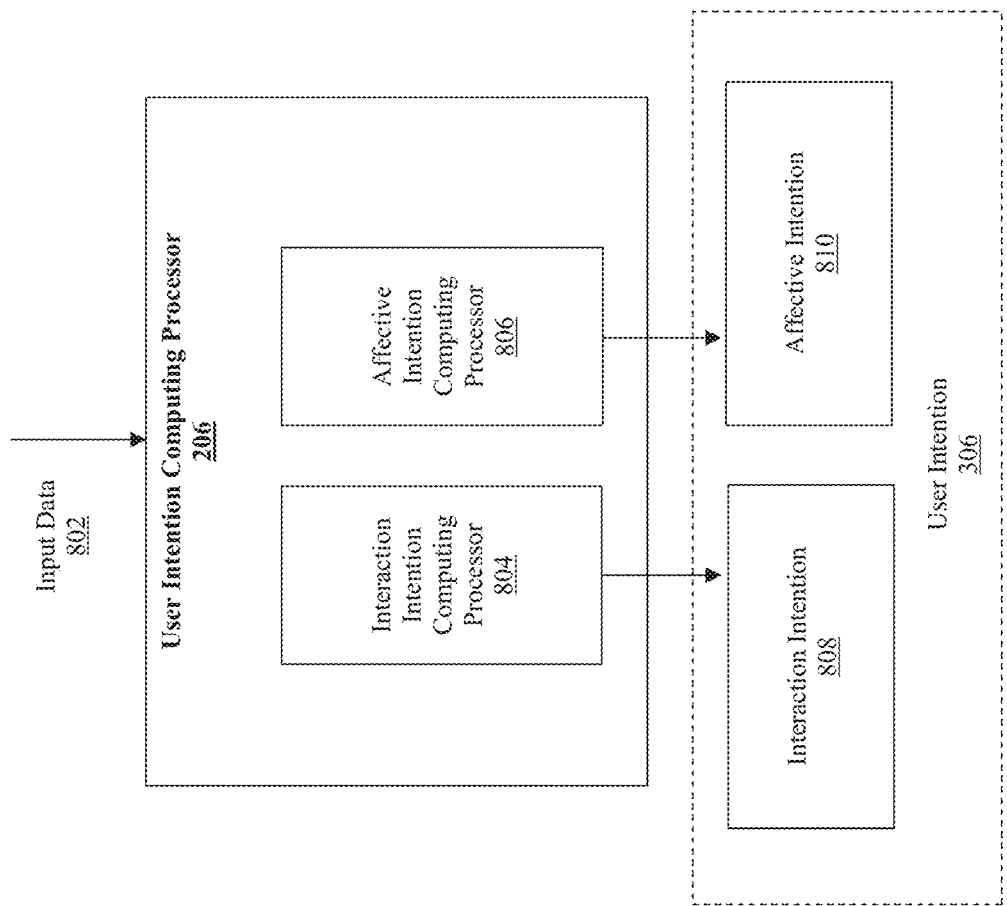
FIG. 8 illustrates a block diagram illustrating an exemplary user intention computing processor, according to embodiments of the present disclosure.

Referring back to FIG. 3A, emotion recognizer 204 may derive an emotion state 304 based on emotion-related data 302, and then transmit it to a user intention computing processor 206 at module 120. As illustrated in FIG. 8, processor 206 may include an interaction intention computing processor 802 to identify/determine an interaction intention 808 and an affective intention computing processor 806 to identify/determine an affective intention 810, based on input data 802. Interaction intention 808 may be a clear behavioral request of a user, such as "the user is asking a certain question," "the user is asking for a certain service," or "the user starts a session of casual chat." Affective intention 810 may be user's emotional request for an affective response or emotion management. For example, if the user is asking a certain question anxiously, his/her emotion is anxiety and his/her affective intention may be expecting a response of "comforting." In some embodiments, interaction intention 808 and affective intention 810 may be either simultaneous or in a sequence of any order. Processor 206 may then obtain a user intention 306, containing interaction intention 808 and affective intention 810.

Figure 9:
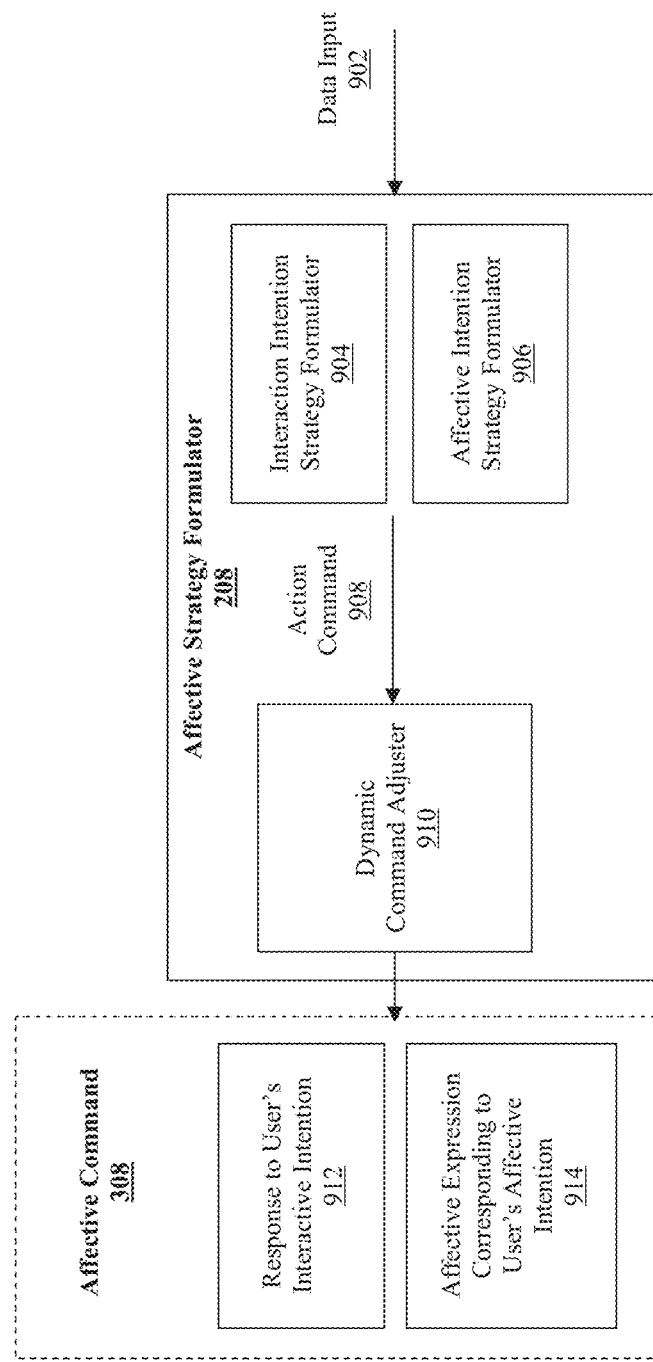
FIG. 9 illustrates a block diagram illustrating an exemplary affective strategy formulator, according to embodiments of the present disclosure.

Referring back to FIG. 3A, user intention computing processor 206 may identify a user intention 306 based on emotion state 304, and transmit it to affective strategy formulator 208 at module 120. Formulator 208 may derive an affective command 308 based on user intention 306. As illustrated in FIG. 9, affective strategy formulator 208 may include an interaction intention strategy formulator 904 to formulate a strategy for interaction intention 808, an affective intention strategy formulator 906 to formulate a strategy for affective intention 810 based on data input 902, and a dynamic command adjustor 910 to adjust the interaction strategy and affective strategy based on admission and priority rules. Formulator 208 may then obtain an affective command 308 based on the afore-formulated strategies. In addition, in some embodiments, an affective intention and an interaction intention might influence each other's strategy formulation process. For example, when a user gives an instruction of "presetting 30 minutes of workout time" to a smart wearable device, the instruction is quite clear here. A smart wearable device without an affective interaction system may follow the instruction and preset the time as required. However, a smart wearable device with an affective interaction system may, for example, detect user's emotion state as "over-excited," because too much previous workout has already led to a high blood pressure level and a heartbeat level. In this case, user's emotion state may influence the smart wearable device's response to user's interaction intention of presetting workout time. It may therefore modify the time length or send out a warning before executing the instruction. Similarly, an interaction intention may influence strategy formulation for an affective intention. For example, when a user commands an affective interaction system, with a sad emotion, to turn off a video game and run a daily online learning software according to user's study timetable. The user's interaction intention is clear, i.e., turning off the video game and running the daily online learning software. And normally, the system will detect user's affective intention as "to comfort his sad emotion" and formulate a strategy to "comfort" him. However, because user's interaction intention also clearly indicates that the user is mandated to switch to the learning software for his own benefit, the affective interaction system therefore may not "comfort" the user, but probably "cheer him up."

With reference to FIG. 9, affective command 308 may include a response to user's interaction intention 906 and an affective expression corresponding to user's affective intention 908 that comprise, among other things, information such as modality, content, and, optionally, intensity of the affective expression and execution instruction. The modality of the affective expression may be directed to one or more modalities, such as a text, a voice, a facial expression, a gesture, and multimodality, which may be determined by taking into consideration of the available affective expression equipment and channels (which modality is capable of displaying?), scenario content (for example, daily conversation, business inquiry, etc.), nature of the affective interaction (for example, text may be used for response to a user question; voice may be used for map navigation), and any other relevant factors. Normally, the modality of the emotion communication made by the user to the affective interaction system may be given a high priority. An execution instruction may include instructions to guide the execution of affective command 308, especially of response to user's interaction intention 810, for example, responding to user's inquiry, executing user's specific order, etc. Content of the affective expression may be a description of what an exact emotion may be expressed as a response to user's intention, including, among other things, different categories and/or values of emotions. An intensity of the emotion expression may be an intensity level of the content of the emotion expression.

Affective command 308 may be considered as operation instructions of the desired affective expression and executive methods for the interface, which contains the required precise information of affective computing expression. For dynamic emotion-related data, even though emotion state 304 may vary from time to time within a defined period of time, formulator 208 may produce intermittent affective commands at a defined time interval according to the varying emotion state 304 or only produce one affective command for the current affective interaction session until the change of emotion state 304 reaches a threshold value and trigger a new session of affective interaction computing.

With reference to FIG. 9, in some embodiments, affective strategy formulator 208 may be implemented based on a semantic database. Formulator 208 may use semantic information as references, including user intention, to match with a certain strategy. The formulator 208 may then derive an affective command based on the strategy. In some other embodiments, affective strategy formulator 208 may be implemented to build a Markov decision process (MDP) model through reinforcement learning based on a collection of status data (emotion-related data, emotion state, and/or semantic data), a collection of actions (normally referring to instructions), state conversion distribution function (the probability of user' emotion state to change after a certain action), reward function (to determine the ultimate purpose of an affective interaction session, e.g., when chatting with a robot, the longer the conversation is, the higher the reward function is). In such embodiments, a well-trained model may be able to formulate an affective and interaction strategy and derive an affective command therefrom directly based on user's various inputs. In such embodiments, user intention computing processor 206 may be configured as a recessive part within the state conversion distribution function.

Referring back to FIG. 3A, formulator 208 may transmit affective command 208 to an affective computing expression generator 210 at multichannel front-end terminal 116. Generator 210 may generate an affective expression 310 based on affective command 208 and convey affective expression 310 back to the user. Generator 210 is used in a later stage of an affective interaction session, where it interacts with the user directly and conveys generated affective expression 310 to the user as a response to a previous emotion communication 102. Affective expression 310 may possibly invoke the user to make more emotion representation, which may lead to the start of another session of affective interaction.

Figure 16:
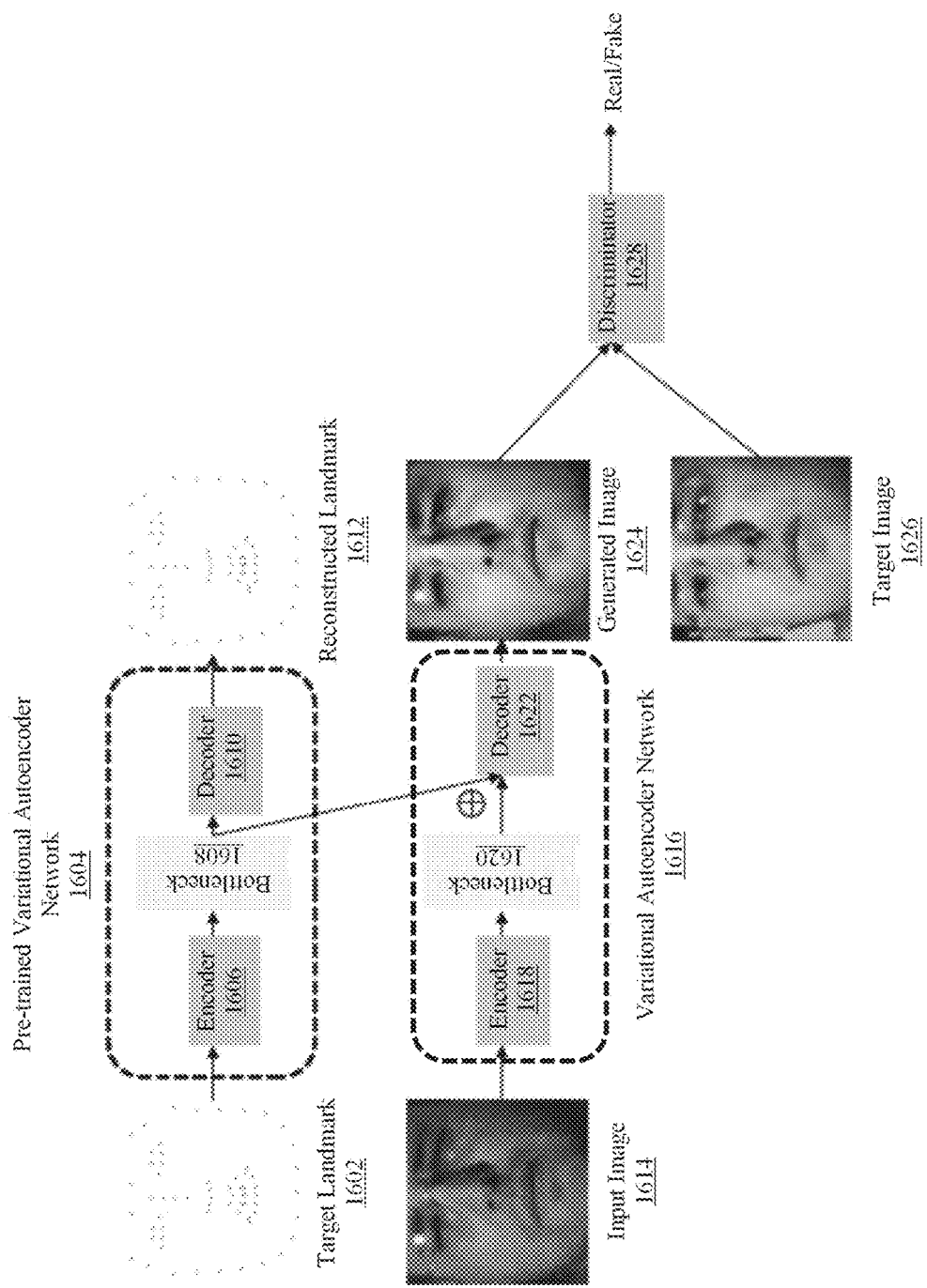
FIG. 16 illustrates an exemplary machine-learning process of generating a facial expression based on human face landmark processing by using variational auto-encoder, according to embodiments of the present disclosure.

In some embodiment, affective computing expression generator 210 may generate a facial expression based on a human face landmark process using a variational auto-encoder (VAE) network, as illustrated in FIG. 16. In some embodiments, as illustrated in FIG. 16, generator 210 may take a target landmark 1602 of a target facial expression image as an input to a pre-trained VAE network 1604, where an encoder 1606 may process target landmark 1602 to derive a feature expression, i.e., bottleneck 1608. The bottleneck 1608 has much lower dimensions than target landmark 1602, which is convenient for the combination of target landmark 1602 and human face image 1614 in feature space. In some embodiments, a decoder 1610 in network 1604 may derive a reconstructed landmark 1612 based on such feature expression. This reconstruction enables the bottleneck 1608 to contain enough information to reconstruct target landmark 1602. In addition, generator 210 may feed a human face image 1614 as an input into another VAE network 1616. An encoder 1618 at network 1616 may process image 1614 to obtain another feature expression, i.e., bottleneck 1620. Generator 210 may cascade or concatenate bottleneck 1608 and bottleneck 1620 together and feed them into a decoder 1622 at network 1616 to generate a target human face image 1624. In the meantime, to enhance the authenticity of the generated target human face image 1624, generator 210 may use a discriminator 1628 to compare generated target human face image 1624 with a true target human face image 1626 and determine whether generated target human face image 1624 is true or false.

Figure 3C:
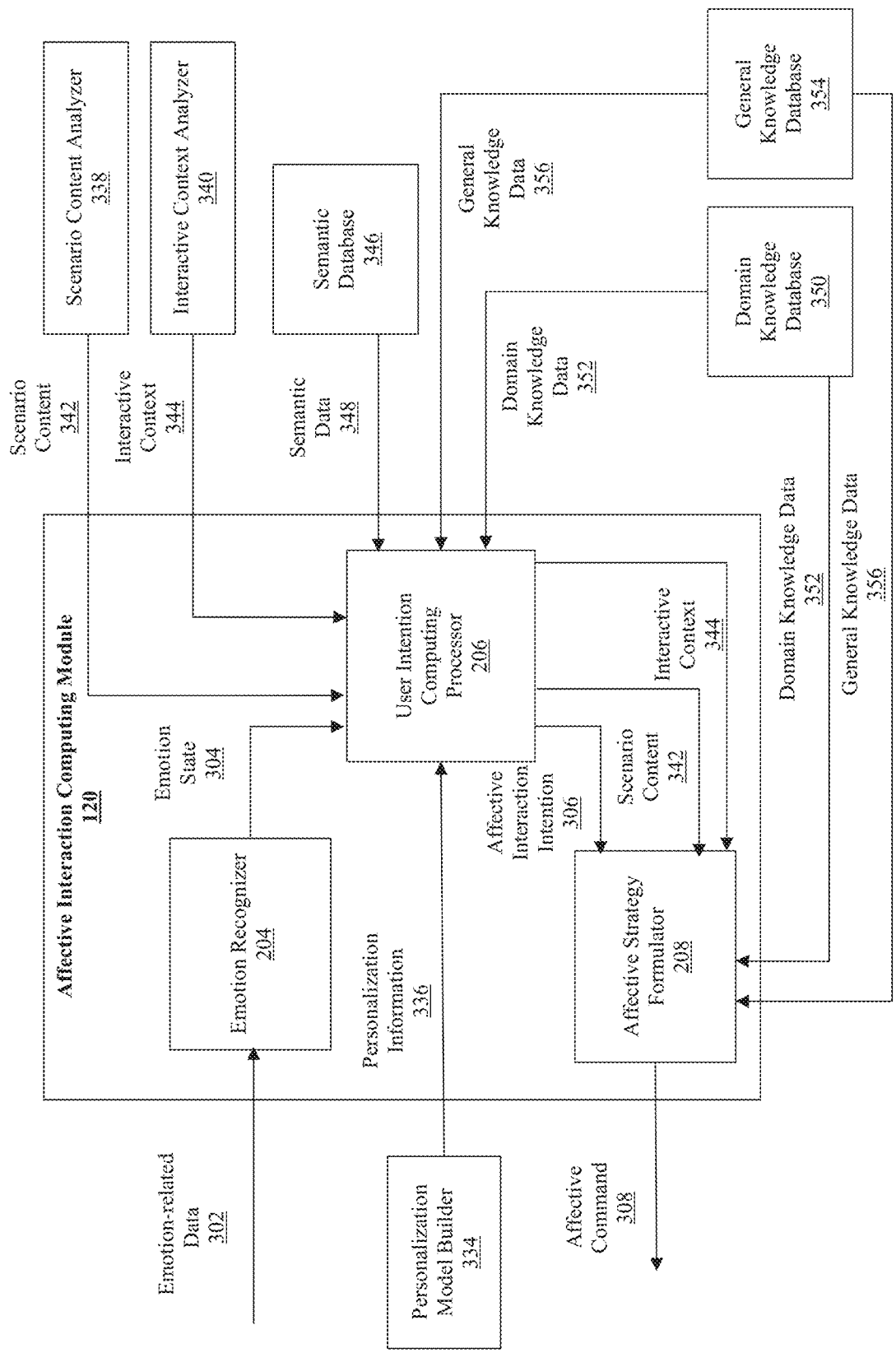
FIG. 3C illustrates a functional diagram illustrating an exemplary affective interaction computing module, according to embodiments of the present disclosure.

FIG. 3C illustrates a functional diagram of an exemplary affective interaction computing module 120, consistent with embodiments of the present disclosure. Without departing from the exemplary embodiments, the exemplary process flow may be altered to delete steps, change the order of steps, or include additional steps.

Module 120 may include, among other things, an emotion recognizer 204, an affective interaction computing processor 206, and an affective strategy formulator 208 to complete an affective interaction computing process. Emotion recognizer 204 may receive emotion-related data 302 as an input and produce an emotion state 304 as an output. Emotion recognizer 204 may then transmit emotion state 304 to processor 206. Processor 206 may take inputs including an emotion state 304, personalization information 336, a scenario content 342, an interactive context 344, semantic data 348, general knowledge data 356, and domain knowledge data 352.

A Personalization model builder 334 may be implemented as a hardware device to recognize a user's identity, build a personalization model for the user based on historical data, user's preference, and user's feedbacks. Personalization information 336 can be based on the user's data input and historical data. Personalization model builder 334 may first authenticate a user's identity. The authentication may be based on, for example, a password, a voice lock based on voice recognition, a face ID lock based on facial recognition, a biometric lock such as a finger print lock, an eye scan lock, etc. Based on user's identity, personalization model builder 334 may build a personalization model for the user after beginning the first ever affective interaction and such model may be developed and modified through constant machine learning and accumulation of user's historical data, preference, and/or feedbacks of the service. Personalization model builder 334 may derive personalization information 336 based on the personalization model. Personalization information 336 may refer to an array of parameters that contain personal information, user's preference with regard to affective interaction and personal emotion characteristic. It helps the affective interaction system to learn the habit and understand the preference of the user. Therefore, the system may be able to prioritize emotion information and intention and command options during the computing process and make adjustment and rectification to the intention identification process. When the user's affective intention is unclear or there are multiple possibilities of affective intentions or affective strategies, personalization information may direct the system to choose the most repeated or preferred option. Personalization information 336 can be derived based on constant machine learning and accumulation of user's historical data, preference, and/or feedbacks of the service.

A scenario content analyzer 338 may be used to derive scenario content 342. In some embodiments, analyzer 338 may be implemented to allow a user to select pre-set scenario options. And the selected scenario content may be in place for a relatively long period and impact the affective interaction computing process. In some other embodiments, analyzer 338 may be implemented to derive scenario content 344 by extracting and analyzing scenario information in an available data input. For example, when the system captures a clip of video of a user, it may not only process the gesture and facial expression of the user, but also analyze the circumstance the user is in and determine the scenario content of the affective interaction. Scenario content 342 may be any relevant information or data regarding a scenario in which an affective interaction takes place, including, among other things, pre-set scenario information, interaction occasion, pre-set logics, environment, and dynamic change of environment and equipment. Scenario content 342 may be closely related to the strategy formulating process, because different scenario contents may lead to different affective strategies for the same intention. For example, when a user expresses "sad" emotion in a hospital environment and in a business place environment, an affective interaction system may formulate different affective strategies as feedbacks based on the environment they are in. The system might express a "cheering" emotion to a user in a business place and a "comforting" emotion to a user in a hospital An interactive context analyze 340 may be used to derive interactive context 344. Interactive context 344 may be interactive context information that includes emotion states and affective intentions in an interactive context corresponding to the interactive context information. In some embodiments, interactive context 344 may be any historical data of past affective interactions and emotion states in an affective interaction session. It may involve recording and retrieving historical interaction data. Interactive context 342 may be derived by retrieving and analyzing historical data.

A semantic database 246 may be used to provide semantic data 348. Semantic data 348 may be a type of data that enables any device in module 120 to understand a meaning of any information by providing the rules for interpreting the syntax.

A general knowledge database 354 may be used to provide general knowledge data 356. General knowledge database 354 may be implemented with a semantic network, an ontology language framework, and/or a Bayesian network to provide general knowledge data 356. It may also be implemented with event evolutionary graphs, machine learning, etc. General knowledge data 356 is a compilation of commonly known knowledge of ordinary people. It may help the affective interaction system to understand basic factual information in an interaction session with a user. Such data, e.g., a common sense, may not vary in or be influenced by different domains or scenarios.

A domain knowledge database 350 may provide domain knowledge data 352. Domain knowledge database 350 may be implemented based on knowledge models that use searching plus reasoning or query methods to describe domain knowledge data 350. Domain knowledge data 350 may refer to a collection of valid knowledge of a specialized discipline, such as business logic in a specific business field, e.g., communication field, finance field, e-government field, e-commerce field, daily life field, intelligent home field, intelligent transportation field, etc. Domain knowledge data may comprise a standard question and one or more extended questions of different expressions but of the same semantic meaning. It may also include an answer corresponding to the standard question and the one or more extended questions. Therefore, domain knowledge data may find answer to any specific question or uncertain information within the specified discipline by search the question or information in domain knowledge data. Domain knowledge data therefore helps an affective interaction system to better understand a term or an issue in a specialized filed.

With reference to FIG. 3C, affective interaction computing processor 206 may output a user intention 306 and transmit it along with scenarios content 342 and interactive context 344 to affective strategy formulator 208. Formulator 208 may take inputs including user intention 306, scenario content 342, interactive context 344, general knowledge data 356, and domain knowledge data 352. Formulator 208 may generate an affective command 308 and transmit the command to, e.g. an AUI, as an execution instruction for generating an affective expression.

Figure 4:
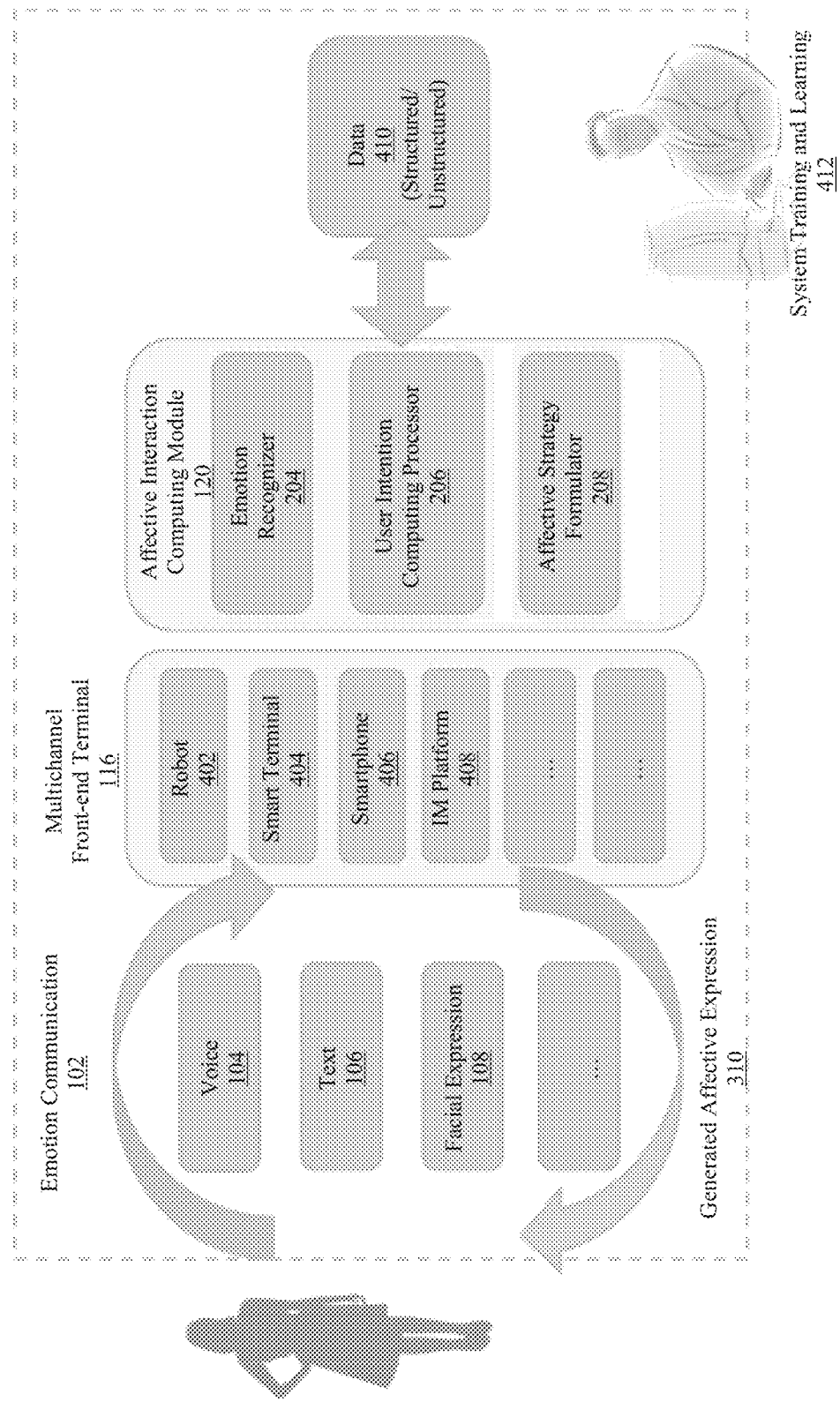
FIG. 4 illustrates a functional diagram illustrating an exemplary affective interaction system from the perspective of a user, according to embodiments of the present disclosure.

FIG. 4 illustrates a functional diagram illustrating an exemplary affective interaction system from a perspective of a user, consistent with the present disclosure. Without departing from the exemplary embodiments, the exemplary process flow may be altered to delete steps, change the order of steps, or include additional steps.

This process flow illustrates how a user sees an affective interaction session with an affective interaction system through an AUI. A user may initiate an emotion communication 102 by providing an emotion in one or more modalities, such as a voice 104, a text 106, and a facial expression 108, etc., to a multichannel front-end terminal 116. From the user's perspective, terminal 116 is a user interface that the user may directly interact with. As explained above, terminal 116 may provide the user with an AUI to collect user's emotion communication 102. For example, a terminal 116 may be a robot 404, a smart terminal 406, a smartphone 408, an instant message (IM) platform 410, etc. Terminal 116 is coupled to an affective interaction computing module 120. Module 120 may include an emotion recognizer 204, a user intention computing processor 206, and an affective strategy formulator 208 to obtain the user's emotion state based on the emotion representation, identify an interaction intention and an affective intention based on the emotion state and other input such as data 410 (structured or unstructured), and formulate strategies for the interaction intention and affective intention and generate an affective command. Module 120 may then send the affective command back to terminal 116, which may generate an affective expression 310 in one or more modalities and provide it to the user as a response to the initial emotion communication 102. In the user's eyes, module 120's operation takes place entirely in the back stage and is not directly visible to the user. The entire affective interaction system comprising terminal 116 and module 120 may be improved through a system training and learning process 412.

Figure 5:
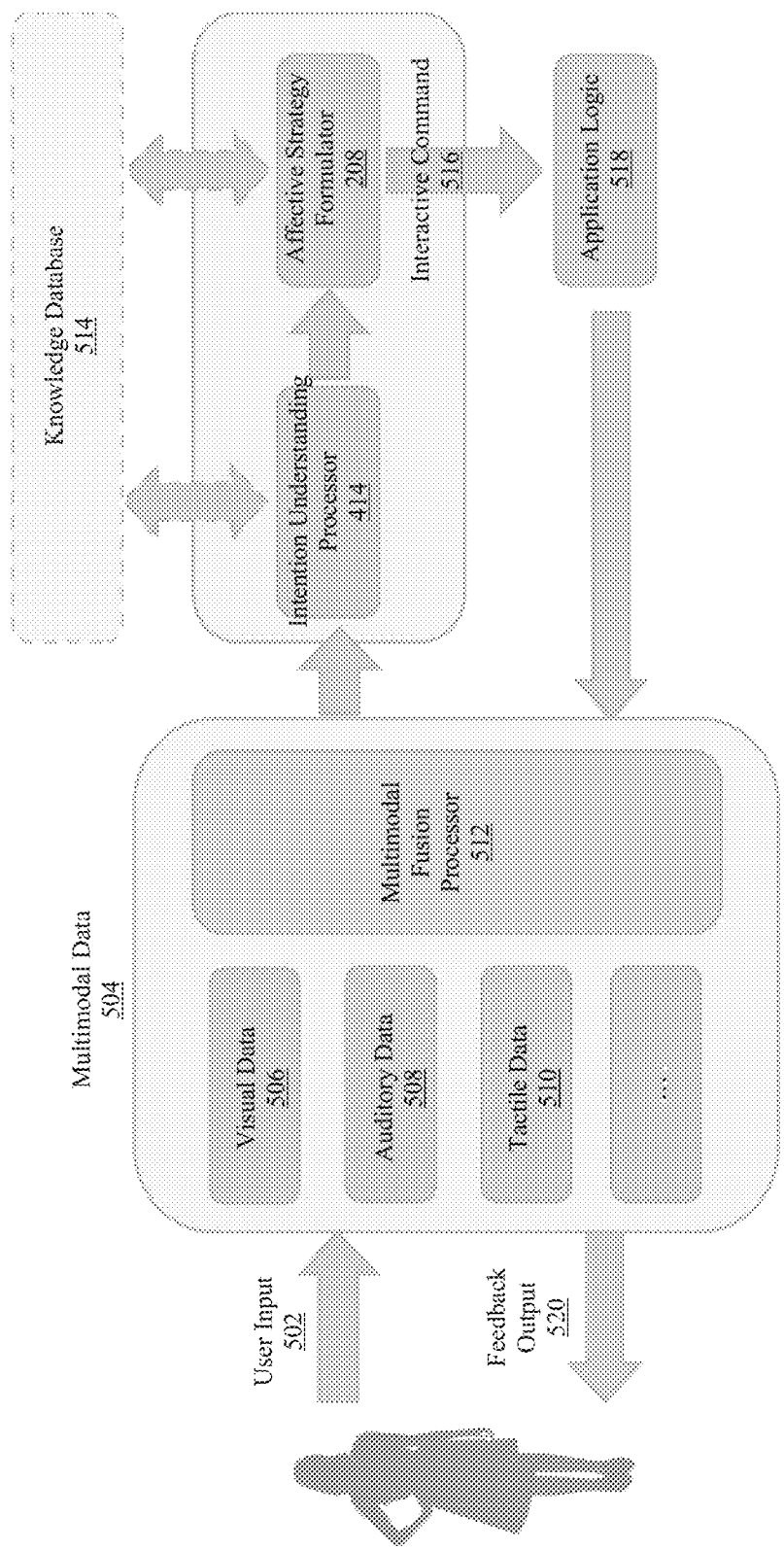
FIG. 5 illustrates a function diagram illustrating an exemplary affective interaction system from a perspective of an affective interaction system, according to embodiments of the present disclosure.

FIG. 5 illustrates a function diagram illustrating an exemplary affective interaction system from a perspective of an affective interaction system, consistent with the present disclosure. This process flow indicates how an affective interaction system sees an affective interaction session through an AUI. The system may capture multimodal data 504 from a user input 502, such as visual data 506, auditory data 508, tactile data 510, etc. The system may adopt different devices and methods to collect and recognize multimodal data 504 and then use a multimodal fusion processor 512 to fuse data 504 for further processing. An intention understanding processor 414 may obtain the user's emotion state based on the fused data, identify an interaction intention and an affective intention based on the emotion state and other inputs from knowledge database 514. An affective strategy formulator 208 may formulate strategies for the interaction intention and affective intention and generate an interactive command 516, which may invoke an application logic 518 to provide a feedback output 520, such as an affective expression, to the user. From the perspective of the affective interaction system, it is important to identify the modalities of user's data input and adopt a corresponding device and method to process such data. Furthermore, in order to keep the affective interaction consistent and adapted to user's communication habit, the system may also be capable of generating feedbacks in multiple modalities.

Figure 10:
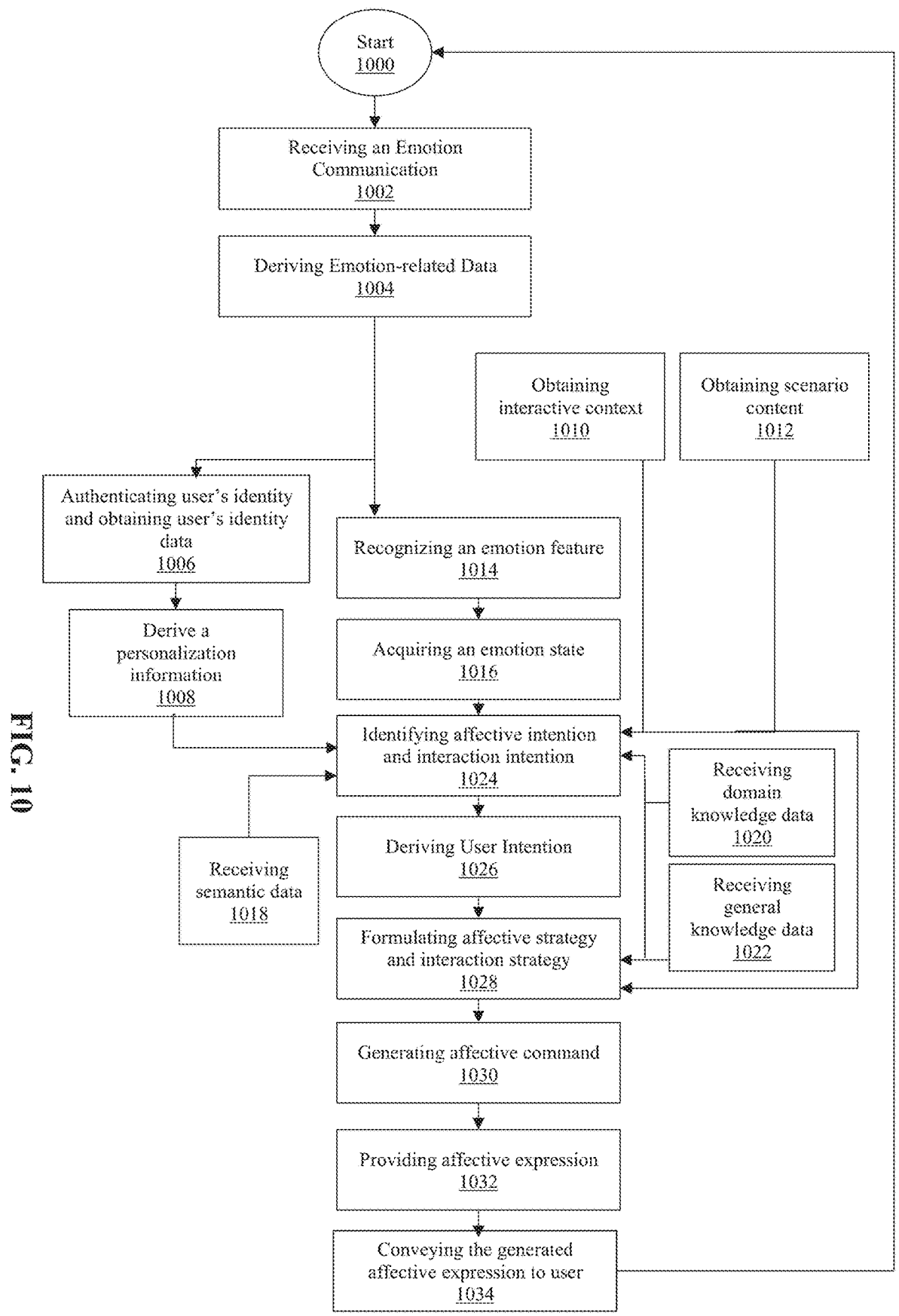
FIG. 10 is a flow chart illustrating an exemplary affective interaction process in an affective interaction system, according to embodiments of the present disclosure.

FIG. 10 is a flow chart illustrating an exemplary affective interaction process in an affective interaction system, consistent with the present disclosure. Without departing from the exemplary embodiments, the exemplary process flow may be altered to delete steps, change the order of steps, or include additional steps.

After starting (1000) an affective interaction session, an affective interaction system (e.g., affective interaction system 100 of FIG. 3A) may receive (1002) an emotion communication from a user and derive (1004) emotion-related data based on the collected emotion communication by using a data collector (e.g., data collector 202 of FIGS. 3A and 3B).

The system may authenticate (1006) the user's identity based on emotion-related data through e.g., a user password or instruction, a user voice password, a user face, a user finger print, a user iris, etc. and obtain (1006) user's identity data by using a personalization model builder (e.g., a personalization model builder 334 of FIG. 3C). Based on the user's identity data, the system may derive (1008) personalization information based on user's historic data, user's preference, and user's feedbacks to indicate user's preference and to adjust and rectify the intention identification process. At step 1010, the system may derive (1010) an interactive context using an interactive context analyzer (e.g., interactive context analyzer 340 of FIG. 3C) for further processing. At step 1012, the system may also derive (1012) a scenario content using a scenario content analyzer (e.g., scenario content analyzer 338 of FIG. 3C) for further processing.

At step 1014, the system may recognize (1014) an emotion feature based on the emotion-related data by using an emotion recognizer (e.g., emotion recognizer 204 of FIGS. 3A and 3C). The system may then acquire (1016) an emotion state by using the emotion recognizer, based on the recognized emotion feature. Also, the system may receive multiple input parameters, including receiving (1018) semantic data from a semantic database (e.g., semantic database 346 of FIG. 3C), receiving (1020) domain knowledge data from an domain knowledge database (e.g., domain knowledge database 350 of FIG. 3C), receiving (1022) general knowledge data from an general knowledge database (e.g., general knowledge database 354 of FIG. 3C), and receiving the personalization information, emotion state, interactive context, and scenario content. Based on the above received input parameters, the system may identify (1024) an affective intention and an interaction intention by using a user intention computing processor (e.g., user intention computing processor 206 of FIGS. 3A and 3C).

At step 1026, the system may then derive and transmit (1026) a user intention containing the affective intention and interaction intention. Based on the domain knowledge data, general knowledge data, and the user intention, the system may formulate (1028) an affective strategy for the affective intention and an interaction strategy for the interaction intention by using an affective strategy formulator (e.g., affective strategy formulator 208 of FIGS. 3A and 3C). The affective strategy formulator may then generate (1030) an affective command based on the affective strategy and interaction strategy. Based on the affective command, the system may then provide (1032) an affective expression and convey (1034) the affective expression back to the user, using an affective computing expression generator 210 (e.g., affective computing expression generator 210 of FIGS. 3A and 3B). The system may then go back and start (1000) another affective interaction session or continue the session. The system may perform the above process in whole or in part, in any sequence or order, with or without any additional steps.

Figure 11:
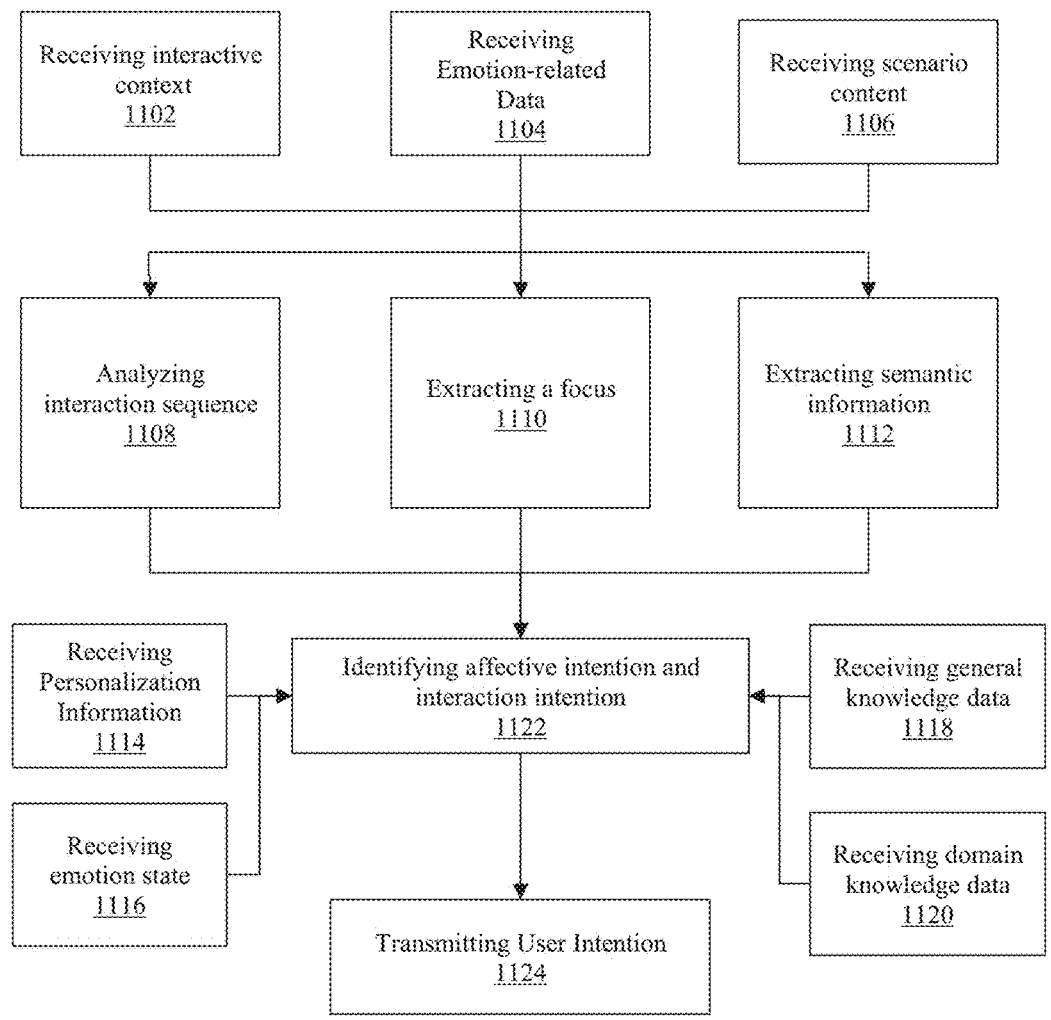
FIG. 11 is a flow chart illustrating an exemplary intention identification process in a user intention computing processor, according to embodiments of the present disclosure.

FIG. 11 is a flow chart illustrating an exemplary intention identification process in a user intention computing processor, consistent with the present disclosure. Without departing from the exemplary embodiments, the exemplary process flow may be altered to delete steps, change the order of steps, or include additional steps.

After receiving multiple input parameters, including receiving (1102) an interactive context, receiving (1104) emotion-related data, and receiving (1106) a scenario content, the user intention computing processor (e.g., user intention computing processor 206 of FIGS. 3A and 3C) may analyze (1108) an interaction sequence, extract (1110) a focus, and extract (1112) semantic information. When analyzing (1118) the interaction sequence, the processor aims to analyze the sequence of user's emotion-related data, when there is more than one possible emotion. In a current interaction session, there may be more than one operations or intentions expressed. And the sequence of the intentions may influence the understanding of each intention. However, based on the emotion-related data in the current interaction session, the processor may be able to predict a trend of a later intention in the same session. Similarly, based on the historical data in a previous interaction session, the processor may be able to predict an intention trend of a new interaction session. By doing so, the scope of the possibly correct intention may be narrowed down, which will help the processor to identify the intention in a faster manner.

When extracting (1110) a focus (e.g., the user's attention or focus of interest) from emotion-related data, the processor aims to determine a weight of certain information for an intention identification process in order to facilitate a selection process in identifying user's intention. For text emotion-related data, in some embodiments, the processor may use a term weighting technology to extract a text or certain words with a focus based on one or more properties of words, words with special attention, etc. In some embodiments, the focus extraction may be made as an independent module based on a term frequency-inverse document frequency (TFIDF) technology. Also for text emotion-related data, in some other embodiments, the focus extraction can be combined with processing of semantic data or intention identification in an encoder-decoder model to formulate an attention model. In such embodiments, the processed semantic data or identified intention may contain words of different weight. And focus extracting may become an inseparable part of the other two processes.

Audio emotion-related data may be converted into a text and a focus in the converted text may be extracted in a similar way as for text emotion-related data, as described above. Besides, in some other embodiments, the processor may also extract a focus from acoustic rhythm characteristics of an audio, including a tone, a stress, a pause, an intonation, etc. Such characteristics may help eliminate an ambiguity, improve the attention on keywords, and enhance accuracy in intention identification.

For visual emotion-related data such as a picture and a video, a focus can be extracted using a computer vision method. After preprocessing the data (e.g., binarization) to obtain pixel distribution information, the processor can identify an object in the visual data based on checking the pixel distribution information. If a presence of a human's area exists in the visual data, the processor can obtain a focus position of the visual data, based on a sight direction of the human's attention point or a direction of a limb movement or a gesture. After obtaining the focus part, the processor can use a semantic conversion to convert substance of the image or video into a text or symbols as a focus part for further processing.

When extracting (1112) semantic information, in some embodiments, the processor gives current emotion-related data a higher priority than historic data or context information. If the current emotion-related data is missing or the user's intention cannot be identified, historic or context information may be referenced. The semantic information extraction may include natural language processing and sematic analysis based on scenario content. In some embodiments, a semantic library may be used in the semantic information extraction. In some embodiments, specific semantic operations are intended to address specific semantic analysis issues, such as multiple-intent identification, contextual intent filling, etc. It should be noted that the process of semantic extraction and intent identification may be indivisible. In some embodiments, a specific intent may be identified based on the semantic library. The processor may derive a text description about emotion-related data in any other modality, e.g. a video, a picture (including a picture without any text), etc. and extract semantic information from the text description. Semantic information extraction is important to the intention identification process, because understanding the semantic meaning of emotion-related data makes a user's intention much more understandable for the processor to identify. An interactive intention and an affective intention can be identified simultaneously or in any sequence or order.

Referring back to FIG. 11, the processor may receive (1114) personalization information, receive (1116) an emotion state, receive (1118) general knowledge data, and receive (1120) domain knowledge data. In some embodiments, based on the analyzed interaction sequence, extracted focus, extracted semantic information, personalization information, emotion state, general knowledge data, scenario content, and/or domain knowledge data, the processor may identify (1122) an affective intention and an interaction intention of the user.

Figure 12A:
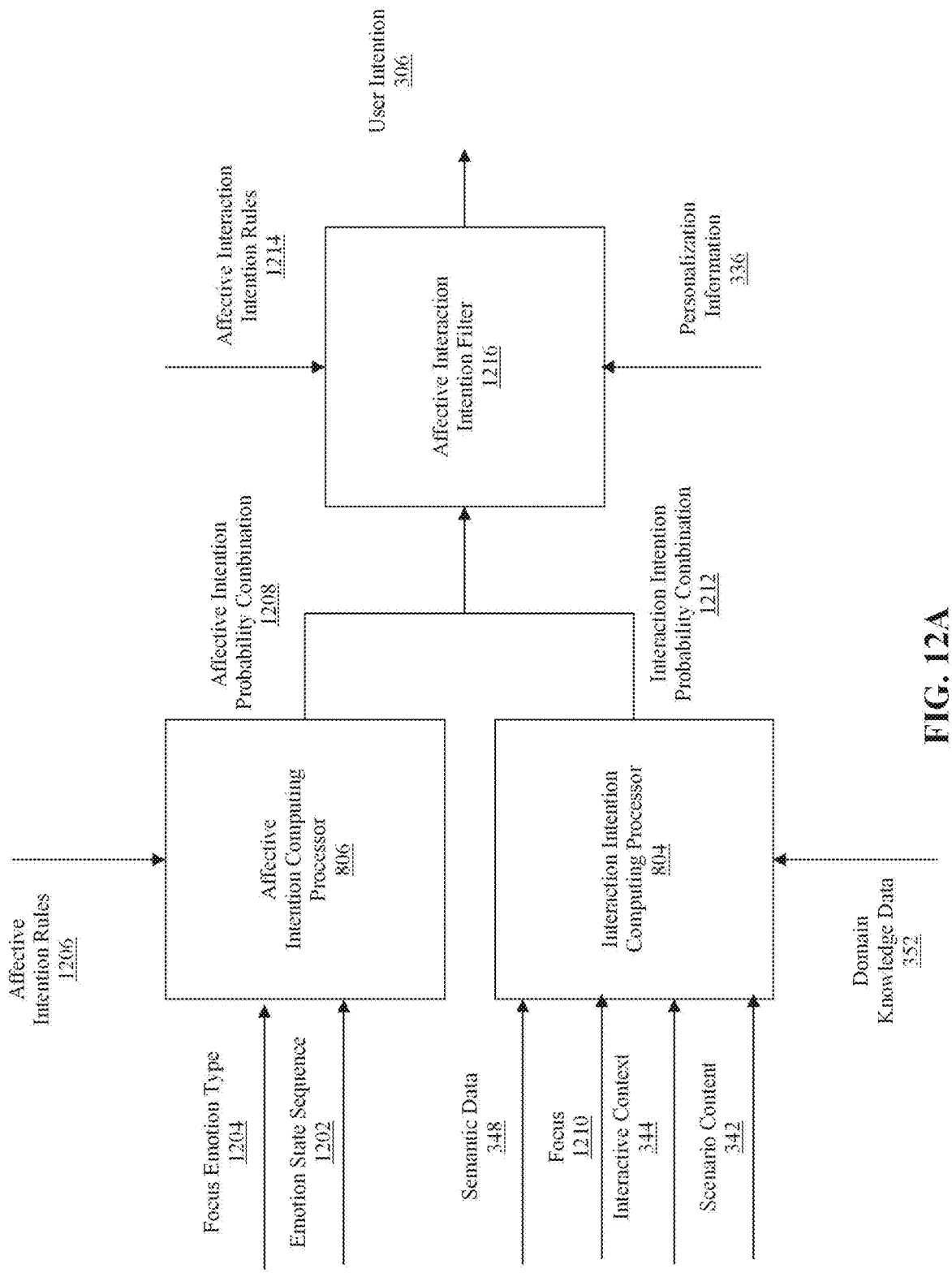
FIG. 12A is a functional diagram illustrating an exemplary user intention computing processor based on Bayesian networks, according to embodiments of the present disclosure.

In some embodiment, the user intention computing processor (e.g., user intention computing processor 206 of FIGS. 2, 3A, 3C, and 8) may be implemented based on Bayesian networks to identify a user's user intention, as illustrated in FIG. 12A. A Bayesian network (also called belief network, belief network, causal network, or probabilistic directed acyclic graphical model) is a probabilistic graphical model that represents a set of variables and their conditional dependencies via a directed acyclic graph. For example, a Bayesian network could represent the probabilistic relationships between affective intentions on one side and a focus emotion type and an emotion state sequence on the other side. Given the focus emotion type and an emotion state sequence, the network can be used to compute the probabilities of the presence of various affective intentions. Nodes of the directed acyclic graph represent variables, and edges of the graph represent conditional dependencies. Nodes that are not connected represent variables that are conditionally independent of each other. Each node is associated with a probability function that takes, as input, a particular set of values for the node's parent variables, and outputs a probability or a probability distribution of the variable represented by the node. A joint probability distribution matrix is a conditional probability table that is associated with a node's numerical property of probabilities.

With reference to FIG. 12A, based on an emotion state sequence 1202, a focus emotion type 1204, and affective intention rules 1206 obtained from an affective intention rule database, an affective intention computing processor 806 may use Bayesian networks to obtain an affective intention probability combination 1208 represented by a joint probability distribution matrix. The joint probability distribution matrix may be initialized by affective intention rules. The matrix may be further updated and optimized through autonomous machine learning based on decision-making feedbacks or human-machine collaboration's adjustments. Combination 1208 contains a series of identified affective intentions organized based on their probabilities of being a correct affective intention for the user.

The affective intention rule database provides a joint probability distribution between affective intention variables and other related variables. In some embodiments, the database provides basic rules, which are used to estimate the joint probability distribution. The focus emotion type is an emotion type corresponding to focus content (e.g., a picture, a paragraph of text, etc. to which a user pays attention). The focus emotion type may be defined with an emotion state sequence in different dimensions, and derived from direct mapping from the focus content based on an emotion common knowledge database. The emotion state sequence is a sequence of emotion changes during a user interaction. Each emotion state is a combination of emotion values in different dimensions, and may be an emotion probability.

A decision-making feedback is a user's feedback to a decision-making result. It includes an implicit feedback (or a passive feedback) and an explicit feedback. The implicit feedback is the user's response (obtained by the system automatically) to the decision-making result, such as a speech, an emotion, an action, and so on. And the explicit feedback is the user's initiative evaluation comments on the decision-making result, and can be, for example, an evaluation score, or an evaluation speech. The decision feedback module here is a mechanism for updating intention inference or computing. That is, the intention inference or computing mechanism can be completed by a system administrator's human-machine collaboration's optimization, and can also be improved on its inference or computing accuracy through machine learning based on decision-making feedbacks.

With reference to FIG. 12A, an interaction intention computing processor 804 may derive an interaction intention probability combination 1212, based on input parameters including semantic data 348, focus 1210, interactive context 344, scenario content 342, and domain knowledge data 352 obtained from a domain knowledge database or map. The domain knowledge database or map provides concepts and examples in a field, and an association or a relationship between the concepts and examples. Processor 804 may inquire the domain knowledge database or map according to the input parameters and obtain interaction intention probability combination 1212.

Based on user intention rules 1214 obtained from a user intention rule database, affective intention probability combination 1208, interaction intention probability combination 1212, and personalization information 336, a user intention filter 1216 may obtain a user intention probability combination represented by a joint probability distribution matrix. The joint probability distribution matrix may be initialized by user user intention rules. The matrix may be further updated and optimized through autonomous machine learning based on decision-making feedbacks or human-machine collaboration's adjustments based on user's feedbacks.

Figure 12B:
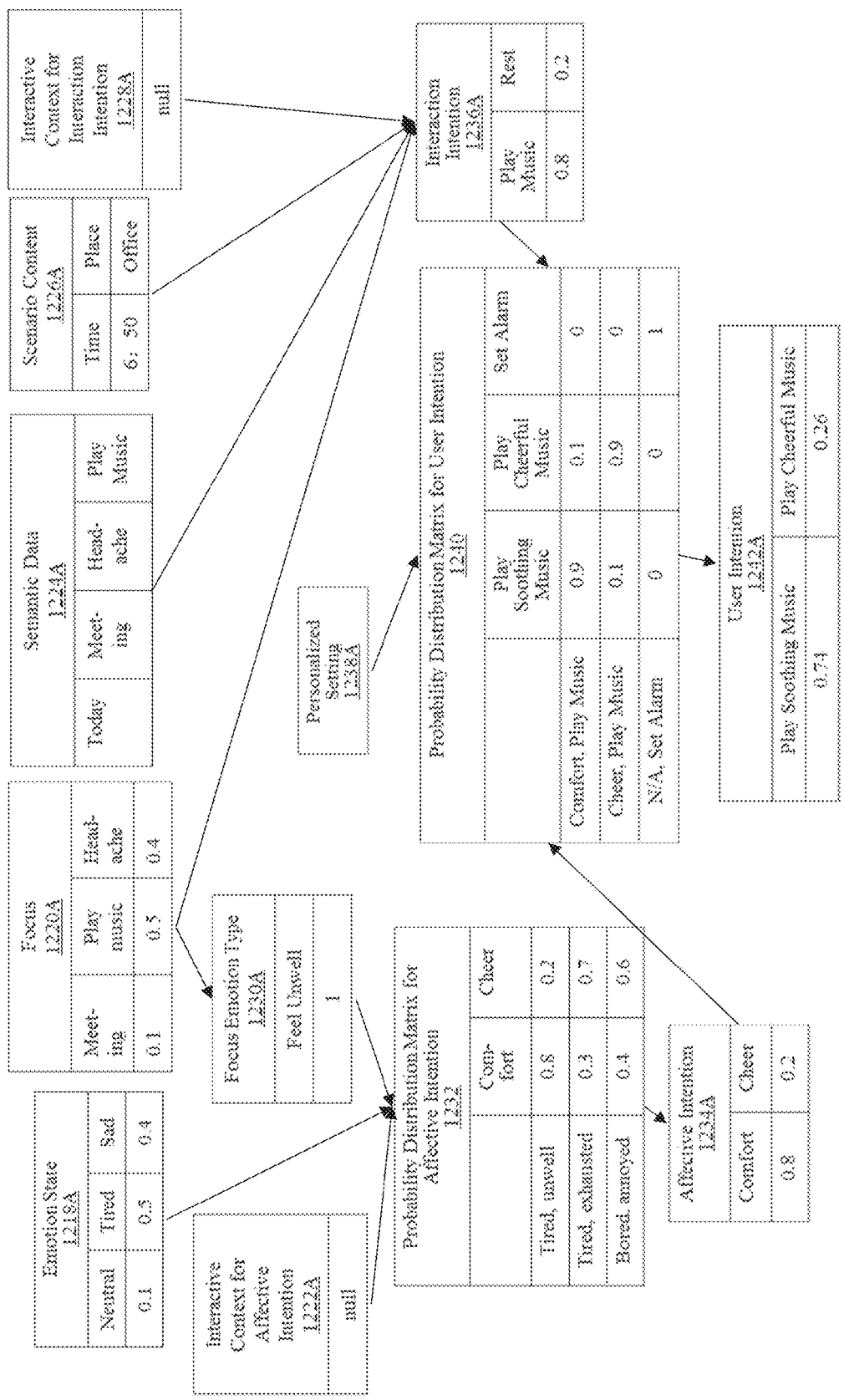
FIGS. 12B through 12D each is a flow chart illustrating an exemplary user intention identification process based on Bayesian networks, according to embodiments of the present disclosure.
Figure 12C:
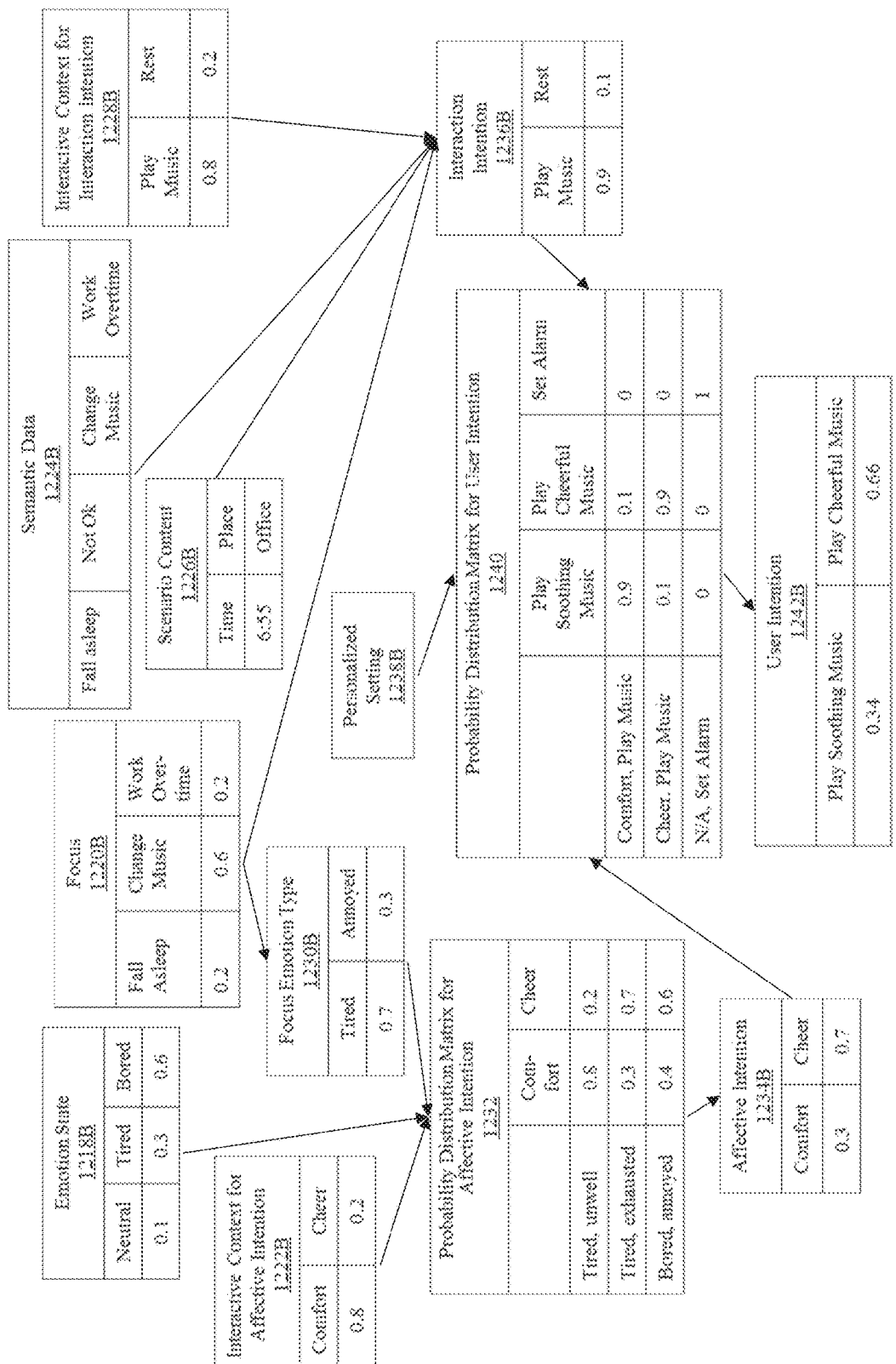
Figure 12D:
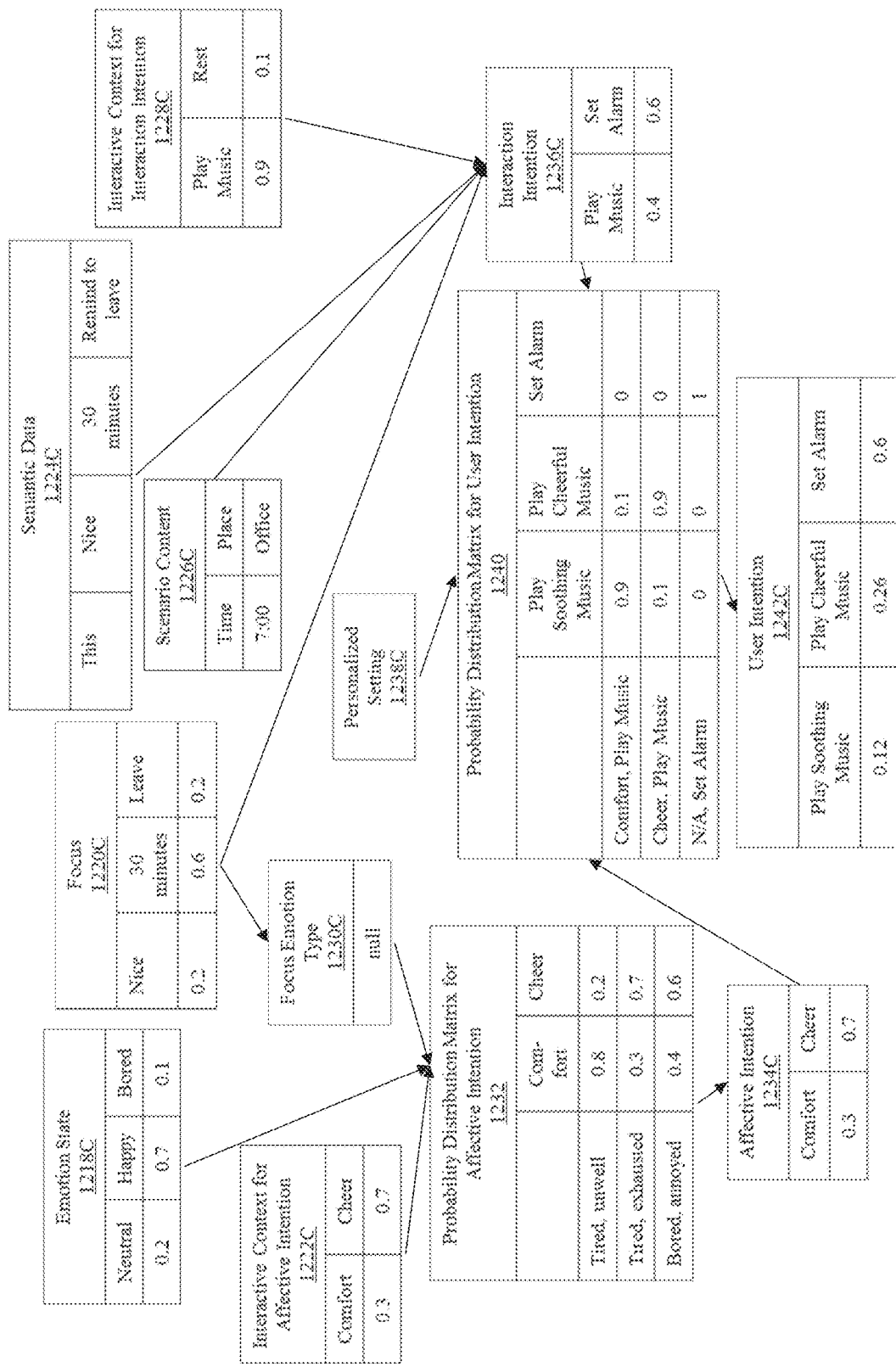

For example, as illustrated in FIGS. 12B through 12D, each of which is a flowchart illustrating an exemplary user intention identification process based on Bayesian networks. They illustrate three consecutive exemplary affective interaction sessions. In each session, a user intention computing processor (e.g., user intention computing processor 206 of FIGS. 2, 3A, 3C, and 8) may use Bayesian networks to identify a user intention. The exemplary affective interaction sessions may be described as follow:

In an exemplary affective interaction session A, a user may tell an exemplary affective interaction system that "I have a headache after a long day of meetings. Please play music for me." And the affective interaction system may then play a soothing music for the user after processing information provided by the user.

In an exemplary affective interaction session B subsequent to exemplary affective interaction session A, a user may then tell the exemplary affective interaction system that "I am going to fall asleep to this music. It's not ok. Please change it to some other music. I still have to work overtime later." And the affective interaction system may then play a cheerful music for the user after processing information provided by the user.

In an exemplary affective interaction session C subsequent to exemplary affective interaction session B, a user may then tell the exemplary affective interaction system that "The music is nice. But remind me to leave in 30 minutes." And the affective interaction system may then continue playing the cheerful music and set an alarm that will go off in 30 minutes for the user after processing information provided by the user.

Session A may be processed based on Bayesian networks as illustrated in FIG. 12B. Based on pre-processed data, a user intention computing processor 206 may obtain probability combinations for the following variables or parameters:

Emotion state 1218A: neutral (0.1), tired (0.5), sad (0.4);
Focus 1220A: meeting (0.1), play music (0.5), and headache (0.4);
Interactive context 1222A for affective intention: (null);
Semantic data 1224A: today, meeting, headache, and play music;
Scenario content 1226A: time (6:50), and place (office); and
Interactive context 1228A for interaction intention: (null).

Interactive context 1222A for affective intention and interactive context 1228A for interaction intention may be described as (null) because it is the beginning of the affective interaction session and there is no history data available to generate an interactive context. Emotion state 1218A, in such embodiments, is expressed in discrete emotion category. Scenario content 1226A may determine the current scenario as in an "office" and accordingly adjust a domain knowledge database to suit the current scenario. Focus 1220A may be extracted focus based on the plain meaning of user's words. Based on focus 1220A, processor 206 may derive a probability combination of focus emotion type 1230A as (feel unwell)(1), which is derived by mapping focus 1220A to a focus emotion type in an emotion common knowledge database. Such mapping rules may be pre-set and/or initialized at the beginning and modified through machine learning. Based on the probability combination of emotion state 1218A, interactive context 1222A for affective intention, and focus emotion type 1230A, processor 206 may match the input probability combinations with a probability distribution matrix 1232 for affective intention and derive an affective interaction combination 1234A. In this embodiment, matrix 1232 may be a fraction of a pre-set probability distribution matrix containing probability value of a potential affective intention under certain condition, described as tired, unwell/comfort (0.8), tired, exhausted/ comfort (0.3), bored, annoyed/comfort (0.4), tired, unwell/ cheer (0.2), tired, exhausted/cheer (0.7), and bored, annoyed/cheer (0.6). Since the focus emotion type 1230A is feel unwell (1), processor 206 may look up "feel unwell" in matrix 1232 and derive probability combination of affective intention 1234A containing the probability value of "comfort" as 0.8 and the probability value of "cheer" as 0.2.

On the other hand, based on focus 1220A, semantic data 1224A, scenario content 1226A, and interactive context 1228A for interaction intention, processor 206 may obtain a probability combination of interaction intention 1236A as play music (0.8) and rest (0.2) by performing probability matching between the input data and a domain knowledge map derived from a domain knowledge database. Processor 206 may also receive personalization information 1238A. Personalization information 1238A may indicate the user's preference as "do not like it when the system provides no feedback." Based on interaction intention 1236A, as well as affective intention 1234A and personalization information 1238A, processor 206 may match the input probability combinations with a probability distribution matrix for user intention 1240 in order to derive user intention 1242A through combination human-machine collaboration's adjustments. In this embodiment, matrix 1240 may be a portion of a pre-set probability distribution matrix containing probability value of a potential user intention matching with certain condition, described as comfort, play music/ play soothing music (0.9), cheer, play music/play soothing music (0.1), N/A, set alarm/play soothing music (0), comfort, play music/play cheerful music (0.1), cheer, play music/ play cheerful music (0.9), N/A, set alarm/play cheerful music (0), comfort, play music/set alarm (0), cheer, play music/set alarm (0), and N/A, set alarm/set alarm (1). If there is no personalization information in the current affective interaction session, processor 206 may match the input probability combinations with matrix 1240 by calculating P(play soothing music×probability value of "play soothing music")=(P(comfort, play music/play soothing music)×P (comfort)+P(cheer, play music/play soothing music)×P (cheer))×P(play music)=(0.9×0.8+0.1×0.2)×0.8=0.592; and P(play cheerful music)=(P(comfort, play music/play cheerful music)×P(comfort)+P(cheer, play music/play cheerful music)×P(cheer))×P(play music)=(0.1×0.8+0.9×0.2)× 0.8=0.208. Therefore, the probability of "play soothing music" may be 0.592 and the probability of "play cheerful music" may be 0.208. However, in the current embodiments, personalization information 1238A may impact the calculation process. As referred in personalization information 1238A, the user may disfavor it when the system does not reply. Therefore, processor 206 may eliminate the probability of "rest" in the probability combination of interaction intention 1236A and make the probability of "play music" as (1). Therefore, the calculation for matching the input probability combinations with matrix 1240 to derive affective interaction 1242A may be, under the impact of personalization information 1238A, changed to P(play soothing music)=(P(comfort, play music/play soothing music)×P (comfort)+P(cheer, play music/play soothing music)×P (cheer))×P(play music)=(0.9×0.8+0.1×0.2)×1=0.74; and P(play cheerful music)=(P(comfort, play music/play cheerful music)×P(comfort)+P(cheer, play music/play cheerful music)×P(cheer))×P(play music)=(0.1×0.8+0.9× 0.2)×=0.26. Processor 206 may then derive user intention 1242A as play soothing music (0.74), play cheerful music (0.26). When multiple identified user intentions are mutually exclusive, the user intention with the greatest probability, e.g. play soothing music, may be selected as user intention 1242A for the current affective interaction session. The obtained affective intention 1234A, interaction intention 1236A and user intention 1242A may be stored in the affective interaction system to be used in machine learning and/or combination human-machine collaboration's adjustments so as to upgrade and optimize the computing process of the system.

In addition, session B may be processed based on Bayesian networks as illustrated in FIG. 12C. Based on pre-processed data, a user intention computing processor 206 may obtain probability combinations for the following variables or parameters:

Emotion state 1218B: neutral (0.1), tired (0.5), sad (0.4);
Focus 1220B: fall asleep (0.2), change music (0.6), work overtime (0.2);
Interactive context 1222B for affective intention: comfort (0.8), and cheer (0.2);
Semantic data 1224B: fall asleep, not ok, change music, work overtime;
Scenario content 1226B: time (6:50), place (office); and
Interactive context 1228B for interaction intention: play music (0.8) and rest (0.2).

Processor 206 obtains the probability combination of interactive context 1222B for affective intention from affective interaction 1234A of FIG. 12B, and the probability combination of interactive context 1228B for interaction intention from interaction intention 1236A of FIG. 12B. Based on focus 1220B, processor 206 may derive a probability combination of focus emotion type 1230B as tired (0.7) and annoyed (0.3), which is derived by mapping focus 1220B to a focus emotion type in an emotion common knowledge database. Based on the probability combination of emotion state 1218B, interactive context 1222B for affective intention, and focus emotion type 1230B, processor 206 may match the input probability combinations with a probability distribution matrix for affective intention 1232, as illustrated in FIG. 12B, and derive an affective interaction 1234B as comfort (0.3) and cheer (0.7).

On the other hand, based on focus 1220B, semantic data 1224B, interactive context 1228B for interaction intention, and scenario content 1226B, processor 206 may derive a probability combination for interaction intention 1236B as play music (0.9) and rest (0.1) by performing probability matching between the input data and a domain knowledge map derived from a domain knowledge database. Based on interaction intention 1236B, affective intention 1234B, and personalization information 1238B, processor 206 may match input probability combinations and a probability distribution matrix for user intention 1240, as described in FIG. 12B, and derive a user intention combination 1242B as (play soothing music) (0.34) and (play cheerful music) (0.66). The probability of rest (0.1) in interaction intention 1236B may be eliminated based on personalization information 1238B, as illustrated in FIG. 12B. The user intention with a greatest probability, e.g. play cheerful music, may be derived as user intention 1242B for the current user intention.

In addition, session C may be processed based on Bayesian networks as illustrated in FIG. 12C. Based on pre-processed data, a user intention computing processor 206 may obtain probability combinations for the following variables or parameters:

Emotion state 1218C: neutral (0.2), happy (0.7), bored (0.1);
Focus 1220C: nice (0.2), 30 minutes (0.6), leave (0.2);
Interactive context 1222C for affective intention: comfort (0.3), cheer (0.7);

Semantic data 1224C: this, nice, 30 minutes, remind to leave;
Scenario content 1226C: time (7:00), place (office); and
Interactive context 1228C for interaction intention: play music (0.9), rest (0.1).

Processor 206 obtains the probability combination of interactive context 1222C for affective intention from affective interaction 1234B of FIG. 12C, and the probability combination of interactive context 1228C for interaction intention from interaction intention 1236B of FIG. 12C. Based on focus 1220C, processor 206 may derive a probability combination of focus emotion type 1230C as tired (null), which is derived by mapping focus 1220C to a focus emotion type in an emotion common knowledge database. Since there is no match in affective interaction C, focus emotion type 1230C may be illustrated as (null). Based on the probability combinations for emotion state 1218C, interactive context 1222C, and focus emotion type 1230C, processor 206 may match the input probability combinations with a probability distribution matrix 1232 for affective intention, as illustrated in FIG. 12C, and derive an affective interaction combination 1234C as comfort (0.3) and cheer (0.7).

On the other hand, based on focus 1220C, semantic data 1224C, interactive context 1228C for interaction intention, scenario content 1226C, and their probability combinations, processor 206 may derive a probability combination of an interaction intention combination 1236C as (play music) (0.4) and (set alarm) (0.6) by performing probability matching between the input data and a domain knowledge map derived from a domain knowledge database. Based on interaction intention 1236C, affective intention 1234C, their probability combinations, and personalization information 1238C, processor 206 may match the input probability combinations and a probability distribution matrix 1240 for a user intention, as illustrated in FIG. 12C, and derive a user intention 1242C as (play soothing music) (0.12), (play cheerful music) (0.26), and (set alarm) (0.6). A user intention with a greatest probability, e.g. set alarm and paly cheerful music (because they are not mutually exclusive) may be derived as user intention 1242C for the current user intention.

Referring back to FIG. 12A, the processor may be implemented based on a semantic database to identify user's intention. Such semantic database enables the processor to match certain semantic information with specific linked intentions in the database. As for interaction intentions, certain semantic information normally matches with a particular interaction intention. The processor may locate key action words on the matching model and then locate a correspondent interaction intention. When the key action words matches with more than one option of semantic information in the model, the processer may make a selection based on a similarity level and use an option with a most similarity as a reference to match an interaction intention. And such matching model may be pre-set or accumulated through machine learning. As for affective intentions, the processor may utilize an emotion semantic database that builds a direction connection between an emotion state and an affective intention in certain scenario content. By analyzing a relation between an emotion state and an identified interaction intention in a matrix, the processor may be able to locate a correct affective intention in the matrix with the interaction intention and emotion state as reference.

Take the matrix (table) below in an emotion semantic database as an example, after a user intention computing processor 206 receives an emotion state and identifies an interaction intention, it may locate the received emotion state in the top row of the matrix and locate the identified interaction intention in the first column of the matrix to obtain a relation between the emotion state and the identified interaction intention. Such relation may direct the processor 206 to a suitable affective intention for a current affective interaction. For instance, when the processor 206 receives an emotion state as "anxiety" and identifies an interaction intention as "check credit limit of a credit card," it may infer a relation between the emotion state and the identified interaction intention as "there is not enough credit left" and therefore identify "expect to be comforted" as the affective intention. The matrix also provides other examples for derive an affective intention based on an emotion state and interaction intention.

| Interaction Intention | Emotion State | | |
|---|---|---|---|
| | Anxiety | Joy | ... |
| Apply for a credit card | Affective Intention: expect to be comforted; Relation between emotion state and identified interaction intention: the application method is unclear, application is rejected, etc. | Affective Intention: expect to be encouraged; Relation between emotion state and identified interaction intention: a new card was just received, ready to receive the card, etc. | ... |
| Check credit limit of a credit card | Affective Intention: expect to be comforted; Relation between emotion state and identified interaction intention: there is not enough credit left, refund of a purchase has not arrived, etc. | Affective Intention: expect to be encouraged; Relation between emotion state and identified interaction intention: regular check of the credit limit, etc. | ... |
| Check repayment due day of a credit card | Affective Intention: expect to be comforted; Relation between emotion state and identified interaction intention: the due day has passed, unable to make the repayment, etc. | Affective Intention: expect to be encouraged; Relation between emotion state and identified interaction intention: regular check, etc. | ... |

In some embodiments, the processor may be implemented based on machine learning to identify user's intention. As for interaction intentions, by learning the past emotion-related data and its matching interaction intentions, the processor may obtain a learning model of such matching rules. In a future identification process, the processor may use user's data to locate a relevant interaction intention based on the matching rules in the learning model. As for affective intentions, by learning a past emotion state and its matching affective intention, the processor may obtain another learning model of such matching rules. In a future identification process, the processor may use the emotion state to locate the relevant affective intention based on the matching rules in the learning model.

In some embodiments, the processor may be implemented based on search algorithms to identify user's intention. The processor may contain an intention dictionary that comprises a directory of interaction intentions and affective intentions. Such dictionary may be pre-set or developed and constantly supplemented by online machine learning, e.g. learning question-answer data. The processor may use search algorithms to use any data input as a key word to search in the dictionary in order to locate the matching intention.

Figure 13:
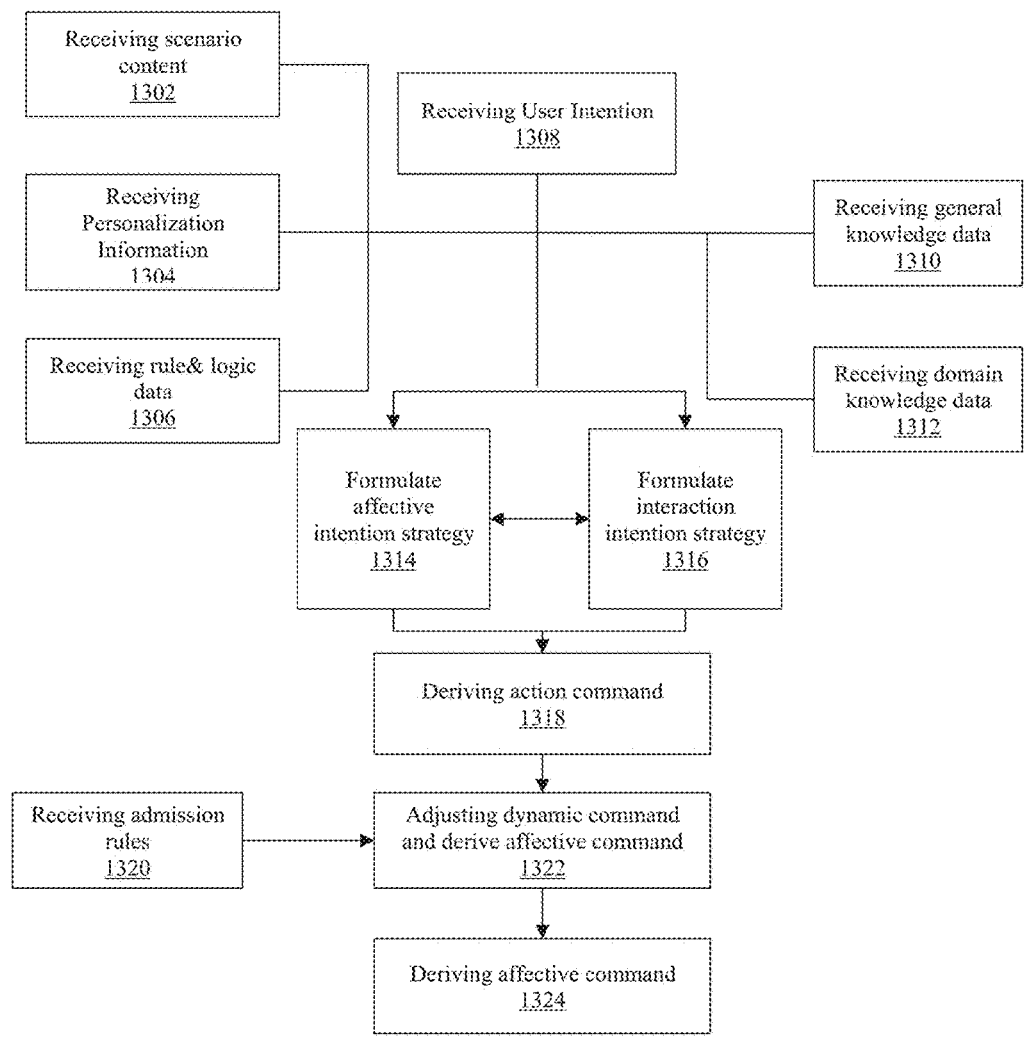
FIG. 13 is a flow chart illustrating an exemplary strategy formulation process in an affective strategy formulator, according to embodiments of the present disclosure.

FIG. 13 is a flowchart illustrating an exemplary strategy formulation process in an affective strategy formulator, consistent with the present disclosure. As illustrated in FIG. 13, an affective intention strategy formulator (e.g., affective intention strategy formulator 906 of FIG. 9) may formulate (1314) an affective intention strategy based on receiving input parameters. Receiving input parameters includes receiving (1302) scenario content, receiving (1304) personalization information, receiving (1306) rules & logic data, receiving (1308) user intention, receiving (1310) general knowledge, and receiving (1312) domain knowledge. An interaction intention strategy formulator (e.g., interaction intention strategy formulator 904 of FIG. 9) may formulate (1316) an interaction intention strategy based on the above one or more input parameters. An affective strategy formulator (e.g., formulator 208 of FIGS. 2, 3A, 3C, and 9) may then derive (1318) an action command based on the formulated strategies. After receiving (1320) admission rules, the formulator may adjust (1322) a dynamic command in the action command to drive (1324) an affective command.

It will now be appreciated by one of ordinary skill in the art that the illustrated methods may be altered to delete steps, change the order of steps, or include additional steps, and that the illustrated system or apparatus may be altered to delete components, change the sequence or order, or include additional components. The systems, apparatus, and methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program may be written in any form of programming language, including compiled or interpreted languages, and it may be deployed in any form, including as a standalone program or as a module, component, subroutine, or other unit suitable for use in a computing environment. A computer program may be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, single central processing unit (CPU) chip, a CPU chip combined on a motherboard, a general purpose computer, or any other combination of devices or modules capable of constructing an intelligent knowledge base such as a question-answer knowledge base based on semantic similarity calculation and/or abstract semantic recommendation disclosed herein.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed is:

1. An affective interaction apparatus, comprising:
an affective interaction computing module including a user intention computing processor to:
receive emotion-related data and an emotion state of a user; and
identify a user intention based on the emotion-related data and the emotion state, the user intention including an affective intention and/or an interaction intention, the affective intention corresponding to the emotion state and including an affective need of the emotion state, the interaction intention including one or more transaction intentions;
wherein the affective intention further comprising:
the affective need of the emotion state; and
a relationship between the interaction intention and the affective need.

2. The affective interaction apparatus of claim 1, wherein the user intention computing processor is further configured to:
receive interactive context information, the interactive context information including emotion states and user intentions in an interactive context corresponding to the interactive context information;
acquire a time sequence of the emotion-related data; and
identify the user intention based on the time sequence, the emotion state, and the interactive context information.

3. The affective interaction apparatus of claim 1, wherein the user intention computing processor is further configured to:
identify the user intention based on the emotion-related data, the emotion state, and an interactive context information by using a Bayesian network, the interactive context information including emotion states and user intentions in an interactive context corresponding to the interactive context information;
identify the user intention based on matching the emotion-related data, the emotion state, and the interactive context information with a preset user intention of an emotion semantic database; or
identify the user intention by searching in an intention library based on the emotion-related data, the emotion state, and the interactive context information, the intention library including one or more user intentions.

4. The affective interaction apparatus of claim 1, wherein the affective interaction computing module further comprises:

an affective strategy formulator coupled to the user intention computing processor to:
formulate an affective command based on the emotion state and the user intention, the affective command including an executable instruction for generating an affective expression in one or more modalities corresponding to the user intention.

5. The affective interaction apparatus of claim 4, wherein the affective strategy formulator is further configured to:
formulate the affective command based on the emotion state and the user intention, if another affective command generated in a previous affective interaction session has been completed;
formulate the affective command based on the user intention corresponding to the emotion state that has dynamically changed, wherein the change of the emotion state exceeds a threshold value; or
formulate the affective command based on the emotion state at a defined time interval, wherein the emotion state is dynamically changing.

6. The affective interaction apparatus of claim 4, wherein the affective command further comprises:
an emotion modality of the affective expression to be presented to the user, wherein the emotion modality is determined based on one or more modalities of the user's data;
an emotion state of the affective expression to be presented to the user; and/or
an emotion intensity of the affective expression to be presented to the user.

7. The affective interaction apparatus of claim 1, further comprising:
a multichannel front-end terminal coupled to affective interaction computing module and including a data collector to:
capture the emotion-related data from the user, and
an emotion recognizer, in the affective interaction computing module, coupled to the data collector and the user intention computing processor to:
receive the emotion-related data,
recognize the emotion state based on the emotion-related data.

8. An affective interaction method, comprising:
receiving, via a user intention computing processor, emotion-related data and an emotion state from a user; and
identifying a user intention based on the emotion-related data and the emotion state, the user intention including an affective intention and/or an interaction intention, the affective intention corresponding to the emotion state and including an affective need of the emotion state, and the interaction intention including one or more transaction intentions;
wherein the affective intention further comprising:
the affective need of the emotion state; and
a relationship between the interaction intention and the affective need.

9. The method of claim 8, further comprising:
receiving interactive context information, the interactive context information including emotion states and user intentions in an interactive context corresponding to the interactive context information;
acquiring a time sequence of the emotion-related data; and
identifying the user intention based on the time sequence, the emotion state, and the interactive context information.

10. The method of claim 8, further comprising:
identifying the user intention based on the emotion-related data, the emotion state, and interactive context information by using a Bayesian network, the interactive context information including emotion states and user intentions in an interactive context corresponding to the interactive context information;
identifying the user intention based on matching the emotion-related data, the emotion state, and the interactive context with a preset user intention of an emotion semantic database; or
identifying the user intention by searching in an intention library based on the emotion-related data, the emotion state, and the interactive context information, the intention library including one or more user intentions.

11. The method of claim 8, further comprising:
formulating, via an affective strategy formulator coupled to the user intention computing processor, an affective command based on the emotion state and the user intention, the affective command including an executable instruction for generating an affective expression in one or more modalities corresponding to the user intention.

12. The method of claim 11, wherein formulating the affective command further comprising:
formulating the affective command based on the emotion state and the user intention, if another affective command generated in a previous affective interaction session has been completed;
formulating the affective command based on the user intention corresponding to the emotion state that has dynamically changed, wherein the change of the emotion state exceeds a threshold value; or
formulating the affective command based on the emotion state at a defined time interval, wherein the emotion state is dynamically changing.

13. The method of claim 11, wherein the affective command further comprises:
an emotion modality of the affective expression to be presented to the user, wherein the emotion modality is determined based on one or more modalities of the user's data;
an emotion state of the affective expression to be presented to the user; and/or
an emotion intensity of the affective expression to be presented to the user.

14. The method of claim 8, wherein identifying the user intention comprises:
analyzing an interaction sequence to predict a trend of a later interaction intention and/or a later affective intention based on a previous identified intention in a same affective interaction session, or to predict a trend of an interaction intention and/or an affective intention in an affective interaction session based on historic data of a previous affective interaction session;
extracting a focus of attention from the emotion-related data to determine a weight of information in the emotion-related data and extract information with a most weight; and
extracting semantic information to obtain a semantic meaning of the emotion-related data based on semantic rules.

15. An affective interaction system, comprising:
an affective interaction computing module including a user intention computing processor to:
receive emotion-related data and an emotion state of a user, and identify a user intention based on the emotion-related data and the emotion state, the user intention including an affective intention and/or an interaction intention, the affective intention corresponding to the emotion state and including an affective need of the emotion state, the interaction intention including one or more transaction intentions; and an affective strategy formulator of the affective interaction computing module coupled to the user intention computing processor to:

formulate an affective command based on the emotion state and the user intention, the affective command including an executable instruction for generating an affective expression in one or more modalities corresponding to the user intention.

16. The affective interaction system of claim 15, further comprising:

a multichannel front-end terminal including a data collector to:
capture the emotion-related data in one or more modalities from the user; and an affective interaction computing module including an emotion recognizer coupled to the data collector to:
receive the emotion-related data,
recognize an emotion state based on the emotion-related data, emotion state containing a discrete emotion category, and/or a dimensional emotion value.

17. The affective interaction system of claim 16, wherein the multichannel front-end terminal further comprises:

an affective computing expression generator coupled to the affective strategy formulator to:
generate the affective expression based on the affective command, and present the generated affective expression to the user.

18. The affective interaction system of claim 15, further comprising:

a scenario content analyzer, coupled to the user intention computing processor, to derive scenario content including information about a scenario in which an affective interaction takes place;

an interactive context analyzer, coupled to the user intention computing processor, to derive interactive context information, the interactive context information including emotion states and user intentions in an interactive context corresponding to the interactive context information;

a semantic database, coupled to the user intention computing processor, to provide semantic data enabling the user intention computing processor to understand a meaning of an input from the user;

a general knowledge database, coupled to the user intention computing processor, to provide general knowledge data enabling the user intention computing processor to understand basic factual information in an interaction session with the user; and a domain knowledge database, coupled to the user intention computing processor, to provide domain knowledge data including business logic in a specific business field, wherein the user intention computing processor identifies the user intention based on the scenario content, the interactive context information, the semantic data, the general knowledge, and/or the domain knowledge data.

* * * * *